United States Patent
Ahn et al.

(10) Patent No.: US 11,743,012 B2
(45) Date of Patent: Aug. 29, 2023

(54) METHOD AND APPARATUS FOR TRANSMITTING OR RECEIVING REFERENCE SIGNAL IN WIRELESS COMMUNICATION SYSTEM

(71) Applicant: LG ELECTRONICS INC., Seoul (KR)

(72) Inventors: Seungjin Ahn, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/049,907

(22) Filed: Oct. 26, 2022

(65) Prior Publication Data

US 2023/0224126 A1     Jul. 13, 2023

(30) Foreign Application Priority Data

Jan. 7, 2022   (KR) .................. 10-2022-0002754
Feb. 11, 2022  (KR) .................. 10-2022-0018217

(51) Int. Cl.
*H04L 5/00*     (2006.01)
*H04W 72/1273*  (2023.01)
(Continued)

(52) U.S. Cl.
CPC ....... *H04L 5/0051* (2013.01); *H04W 72/0446* (2013.01); *H04W 72/1273* (2013.01); *H04W 76/20* (2018.02)

(58) Field of Classification Search
None
See application file for complete search history.

(56) References Cited

U.S. PATENT DOCUMENTS

2019/0109750 A1*  4/2019  Nam ................ H04L 5/0082
2021/0167911 A1*  6/2021  Xiao ............... H04L 5/0057
(Continued)

FOREIGN PATENT DOCUMENTS

WO   2019195171   10/2019
WO   2021063400    4/2021

OTHER PUBLICATIONS

European Patent Office Application Serial No. 22203794.7, Search Report dated May 15, 2023, 14 pages.

(Continued)

*Primary Examiner* — Jutai Kao
(74) *Attorney, Agent, or Firm* — LEE HONG DEGERMAN KANG WAIMEY

(57) ABSTRACT

A method and an apparatus for transmitting or receiving a reference signal in a wireless communication system are disclosed. A method of receiving a tracking reference signal (TRS) by a terminal in a wireless communication system according to an embodiment of the present disclosure may comprise: receiving, from a network, at least one of first offset information related to at least one burst of the TRS, or second offset information related to the at least one burst; and receiving, from the network, the TRS in the at least one burst, wherein the first offset information is related to a first burst of the at least one burst, wherein, based on the second offset information being absent, a number of the at least one burst is one, and wherein, based on the second offset information being present, the second offset information indicates an offset between the first burst and a second burst.

14 Claims, 20 Drawing Sheets

(51) Int. Cl.
*H04W 76/20* (2018.01)
*H04W 72/0446* (2023.01)

(56) References Cited

U.S. PATENT DOCUMENTS

2022/0225251 A1* 7/2022 Yang .................... H04L 5/0098
2022/0271899 A1* 8/2022 Hsieh ................... H04L 5/0094

OTHER PUBLICATIONS

Moderator (Huawei), "Summary#2 of efficient SCell activation/de-activation mechanism of NR CA", R1-2106148, 3GPP TSG RAN WG1 Meeting #105-e, May 2021, 62 pages.

* cited by examiner

| Serving SCell index | SCell RS ID | $C_0$ | Oct 1 |

...

(b)

| T | Serving SCell index | SCell RS ID | $C_0$ | Oct 1 |

...

(c)

| $C_7$ | $C_6$ | $C_5$ | $C_4$ | $C_3$ | $C_2$ | $C_1$ | P | Oct 1 |
| SCell 7 RS ID | | | SCell 4 RS ID | | SCell 1 RS ID | | | Oct 2 |
| R | R | R | R | R | R | R | | Oct 3 |

...

(d)

| $C_7$ | $C_6$ | $C_5$ | $C_4$ | $C_3$ | $C_2$ | $C_1$ | P | Oct 1 |
| SCell 2 RS ID | | | | SCell 1 RS ID | | | | Oct 2 |

...

| R | R | R | R | SCell 7 RS ID | | | | Oct 5 |

|  | $C_7$ | $C_6$ | $C_5$ | $C_4$ | $C_3$ | $C_2$ | $C_1$ | $C_0$ | Oct 1 |
|---|---|---|---|---|---|---|---|---|---|
| (a) | R | R | RS ID | | R | R | RS ID | | Oct 2 |

...

| R | R | RS ID | | R | R | RS ID | |

|  | $C_7$ | $C_6$ | $C_5$ | $C_4$ | $C_3$ | $C_2$ | $C_1$ | $C_0$ | Oct 1 |
|---|---|---|---|---|---|---|---|---|---|
| (b) | RS ID | | | | RS ID | | | | Oct 2 |

...

| RS ID | | | | RS ID | | | |

| $C_7$ | $C_6$ | $C_5$ | $C_4$ | $C_3$ | $C_2$ | $C_1$ | R | Oct 1 |
|---|---|---|---|---|---|---|---|---|
| $X_1$ (CSI report related) | | \multicolumn{6}{c}{$Y_1$ (TRS ID related)} | | Oct 2 |
| ... | | | | | | | | ... |
| $X_n$ (CSI report related) | | $Y_n$ (TRS ID related) | | | | | | Oct n+1 |

(b)

| $C_7$ | $C_6$ | $C_5$ | $C_4$ | $C_3$ | $C_2$ | $C_1$ | | Oct 1 |
|---|---|---|---|---|---|---|---|---|
| AC | R | TRS ID | | | | | | Oct 2 |
| ... | | | | | | | | ... |
| AC | R | TRS ID | | | | | | Oct n+1 |

(c)

| $C_7$ | $C_6$ | $C_5$ | $C_4$ | $C_3$ | $C_2$ | $C_1$ | | Oct 1 |
|---|---|---|---|---|---|---|---|---|
| R | TRS ID | | | R | TRS ID | | | Oct 2 |
| ... | | | | | | | | ... |
| R | TRS ID | | | R | TRS ID | | | Oct n+1 |

METHOD AND APPARATUS FOR TRANSMITTING OR RECEIVING REFERENCE SIGNAL IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application Nos. 10-2022-0002754, filed on Jan. 7, 2022, and 10-2022-0018217, filed on Feb. 11, 2022, the contents of which are all hereby incorporated by reference herein in their entireties.

TECHNICAL FIELD

The present disclosure relates to a wireless communication system, and more particularly, to a method and an apparatus for transmitting or receiving a reference signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for providing fast and efficiently information on a reference signal (RS) related to a cell activation for a terminal in a wireless communication system.

An additional technical object of the present disclosure is to provide a method and an apparatus for performing fast and efficiently channel state information (CSI) feedback related to a cell activation for a terminal in a wireless communication system.

An additional technical object of the present disclosure is to provide a method and an apparatus for providing information related to timing related to a reference signal (RS) from a network to a terminal, based thereon, performing reception of a reference signal (RS) by a terminal related to a cell activation for a terminal in a wireless communication system.

The technical objects to be achieved by the present disclosure are not limited to the above-described technical objects, and other technical objects which are not described herein will be clearly understood by those skilled in the pertinent art from the following description.

According to an aspect of the present disclosure, a method of receiving a tracking reference signal (TRS) by a terminal in a wireless communication system may comprise: receiving, from a network, at least one of first offset information related to at least one burst of the TRS, or second offset information related to the at least one burst; and receiving, from the network, the TRS in the at least one burst, wherein the first offset information is related to a first burst of the at least one burst, wherein, based on the second offset information being absent, a number of the at least one burst is one, and wherein, based on the second offset information being present, the second offset information indicates an offset between the first burst and a second burst.

According to another aspect of the present disclosure, a method of transmitting a tracking reference signal (TRS) by a terminal in a wireless communication system may comprise: transmitting, to a terminal, at least one of first offset information related to at least one burst of the TRS, or second offset information related to the at least one burst; and transmitting, to the terminal, the TRS in the at least one burst, wherein the first offset information is related to a first burst of the at least one burst, wherein, based on the second offset information being absent, a number of the at least one burst is one, and wherein, based on the second offset information being present, the second offset information indicates an offset between the first burst and a second burst.

According to the present disclosure, a method and an apparatus for providing fast and efficiently information on a reference signal (RS) related to a cell activation for a terminal in a wireless communication system may be provided.

According to the present disclosure, a method and an apparatus for performing fast and efficiently channel state information (CSI) feedback related to a cell activation for a terminal in a wireless communication system may be provided.

According to the present disclosure, a method and an apparatus for providing information related to timing related to a reference signal (RS) from a network to a terminal, based thereon, performing reception of a reference signal (RS) by a terminal related to a cell activation for a terminal in a wireless communication system may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

FIG. 10 is a diagram illustrating various examples of a MAC CE indicating SCell activation and TRS information according to the present disclosure.

FIGS. 11 and 12 are diagrams illustrating various examples of MAC CE indicating SCell activation, TRS information, and/or CSI reporting according to the present disclosure.

FIG. 18 is a diagram illustrating examples of TRS-related MAC CE according to the present disclosure.

DETAILED DESCRIPTION

Figure 1:
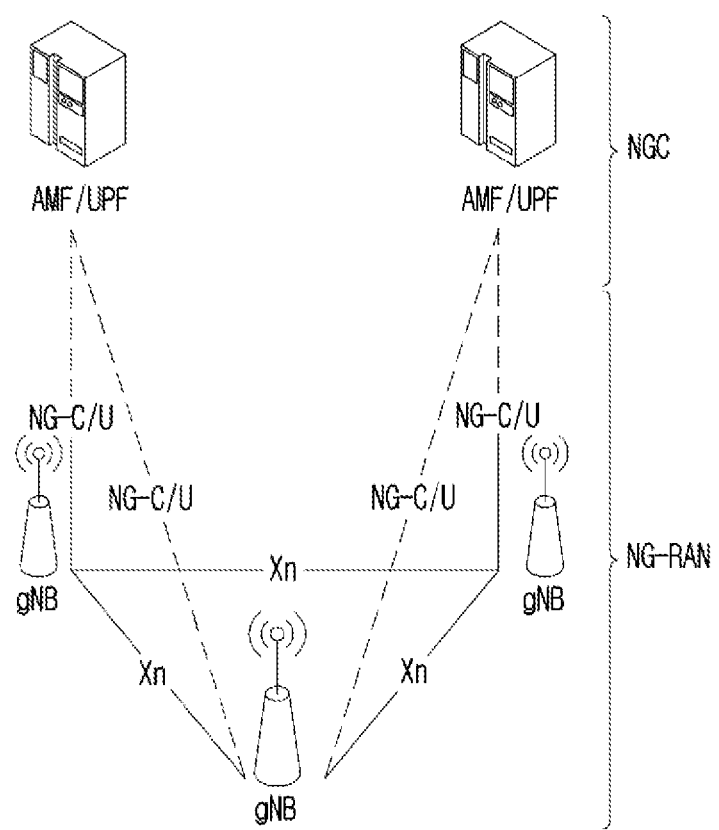
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
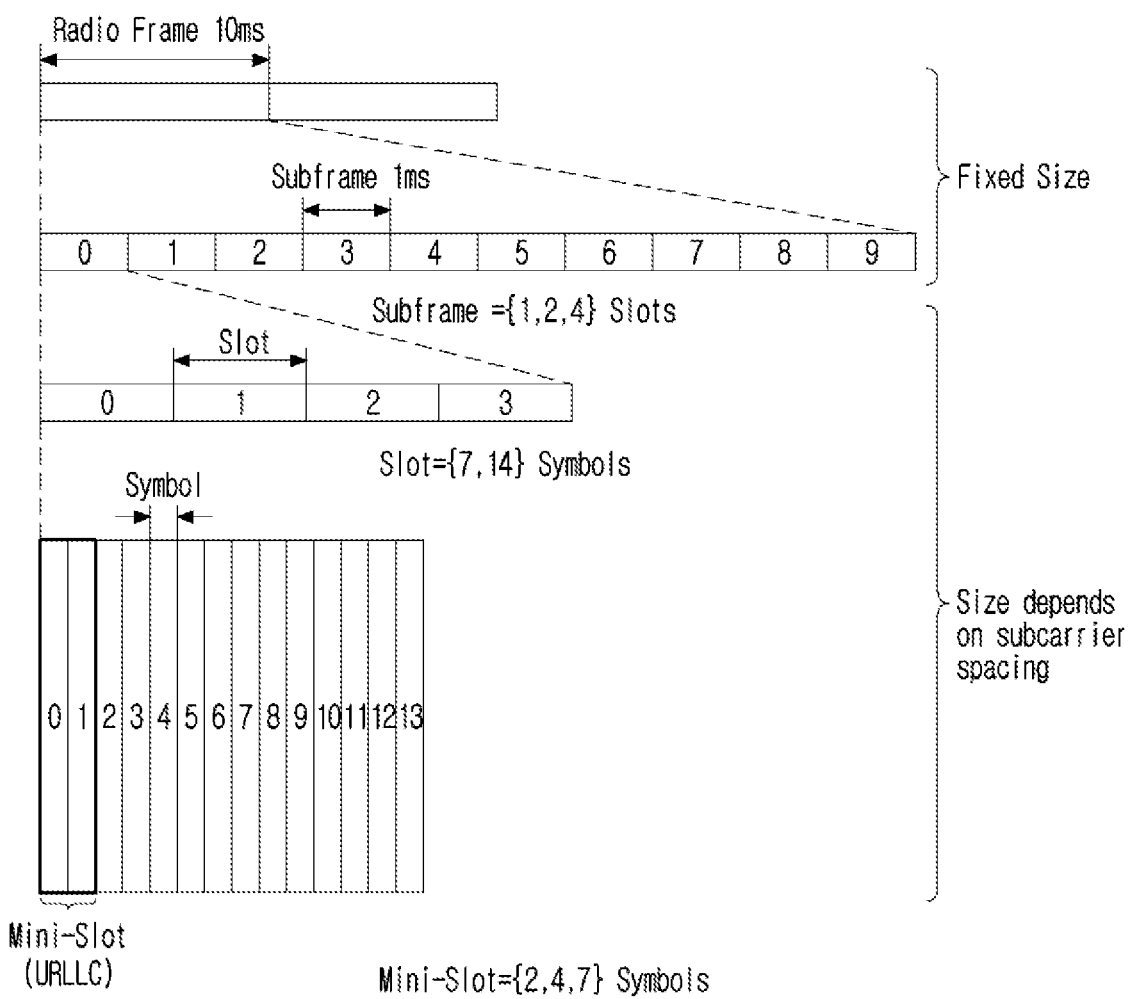
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration µ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on µ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
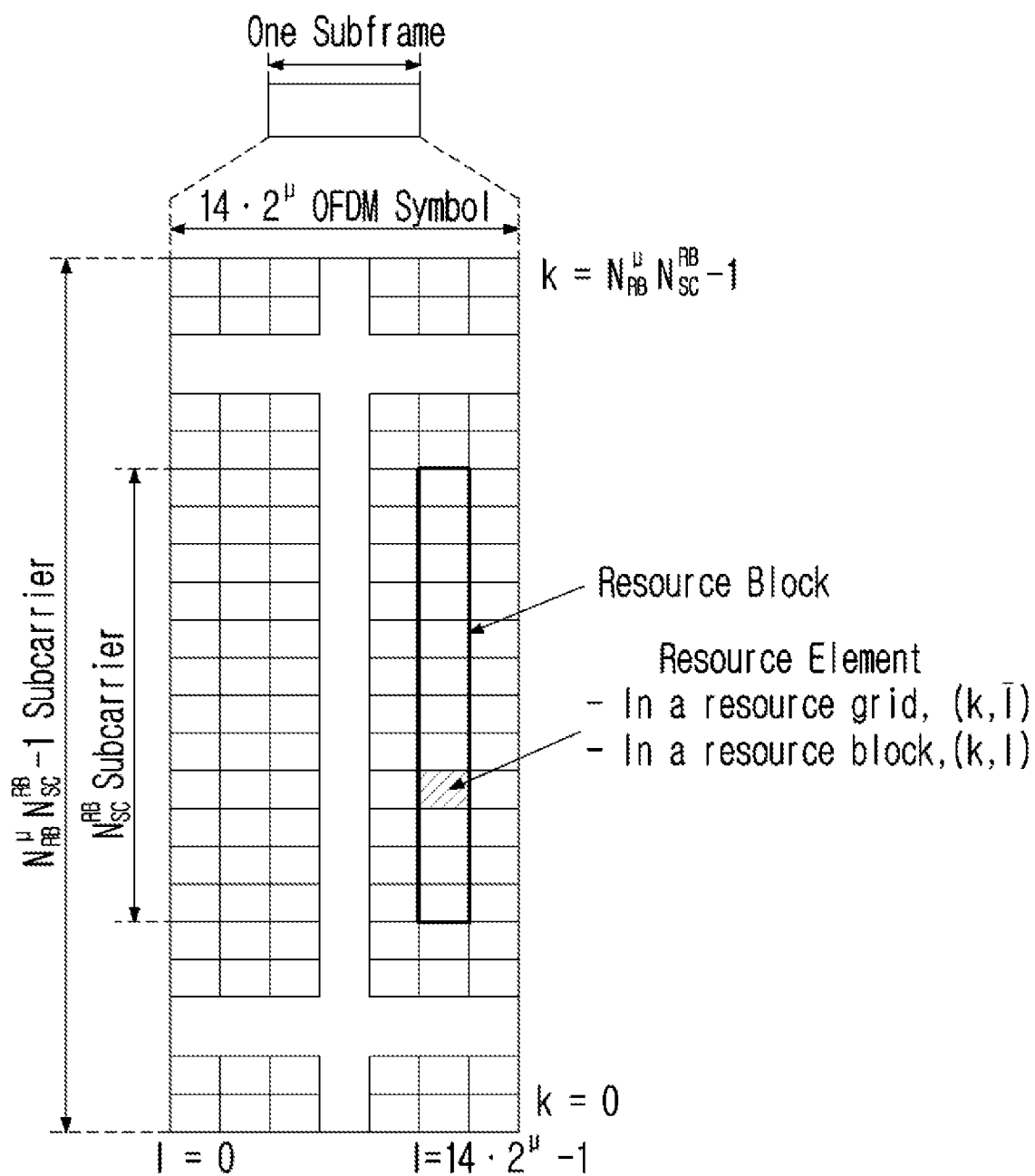
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per µ and antenna port p. Each element of a resource grid for µ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
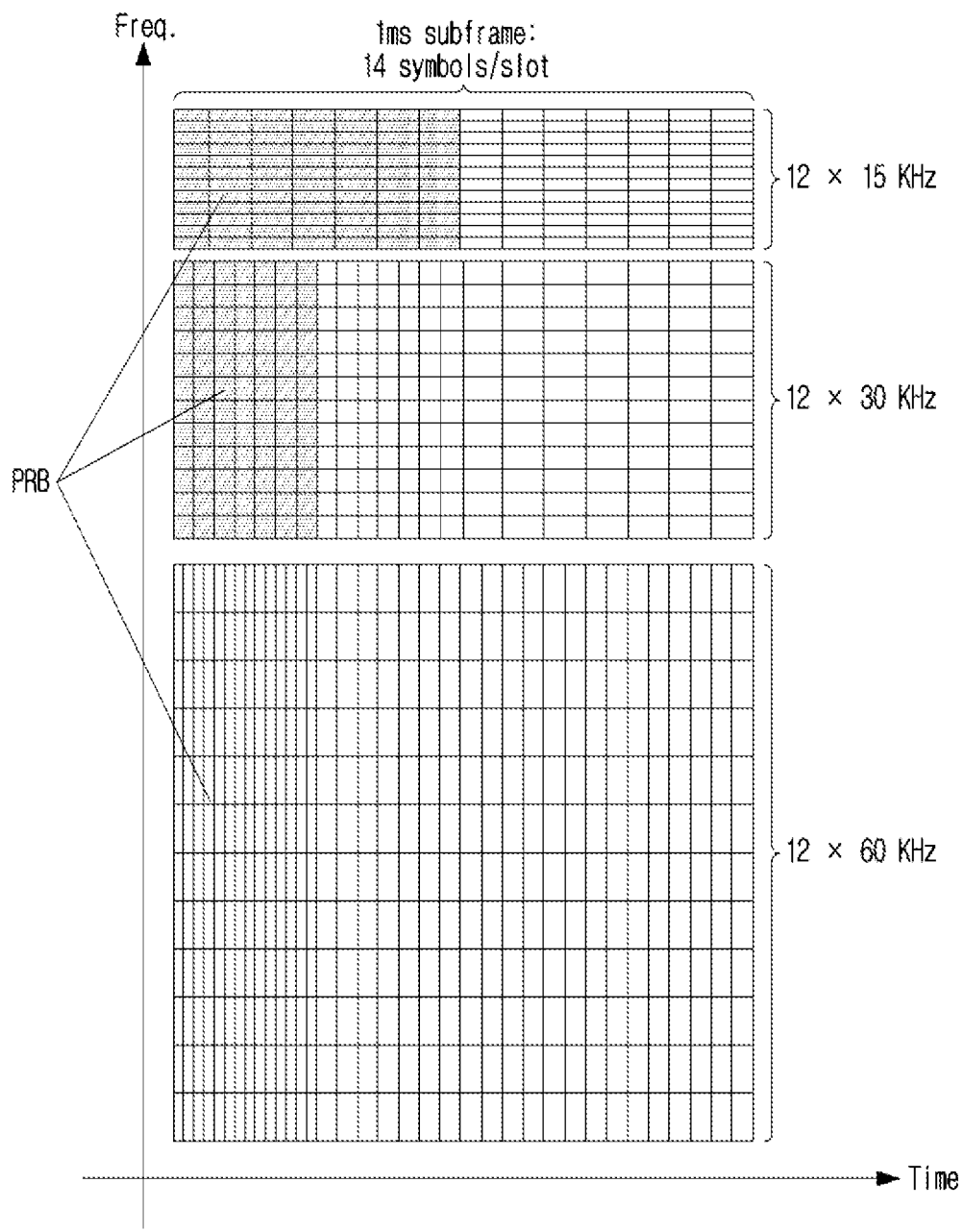
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
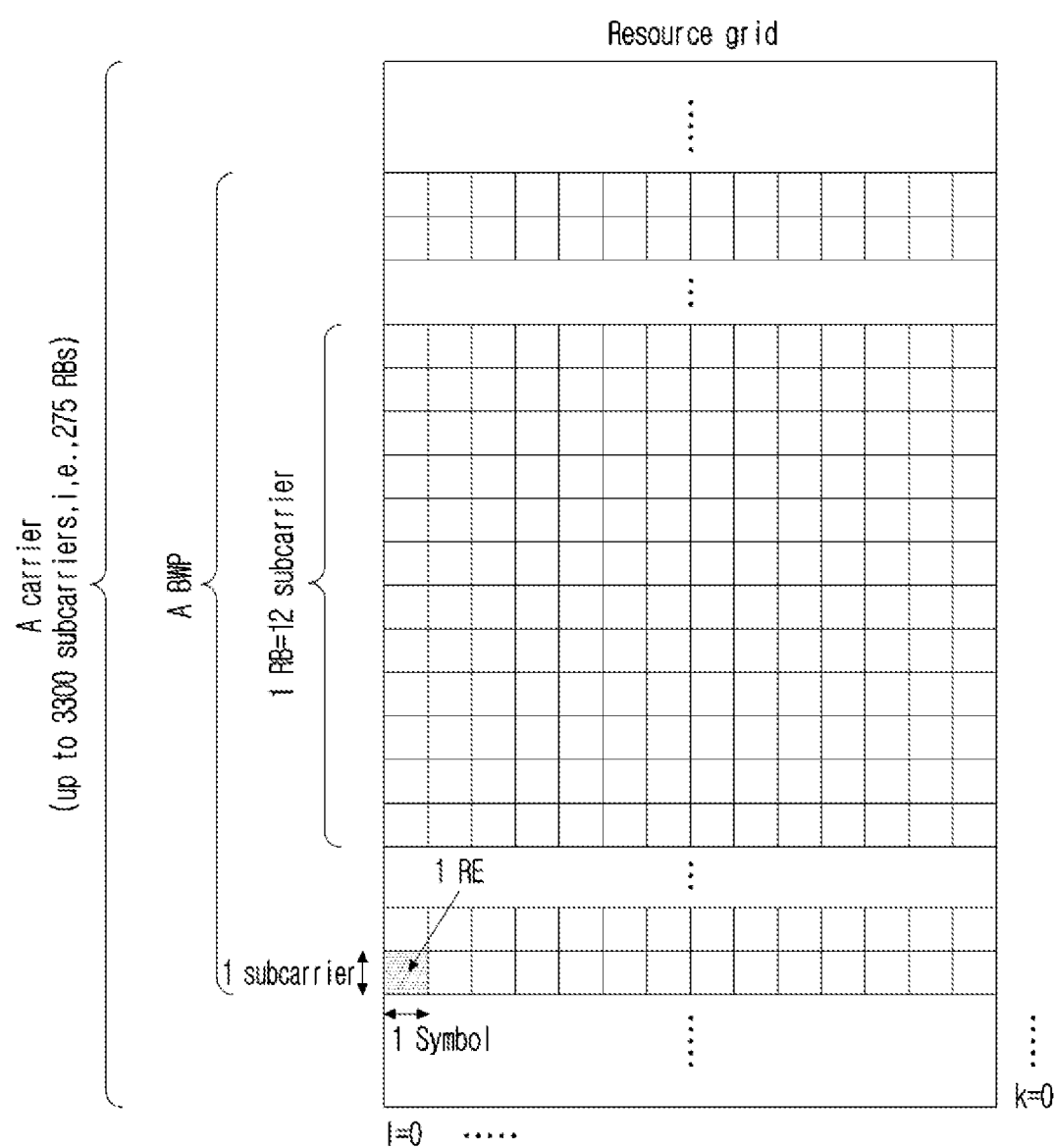
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
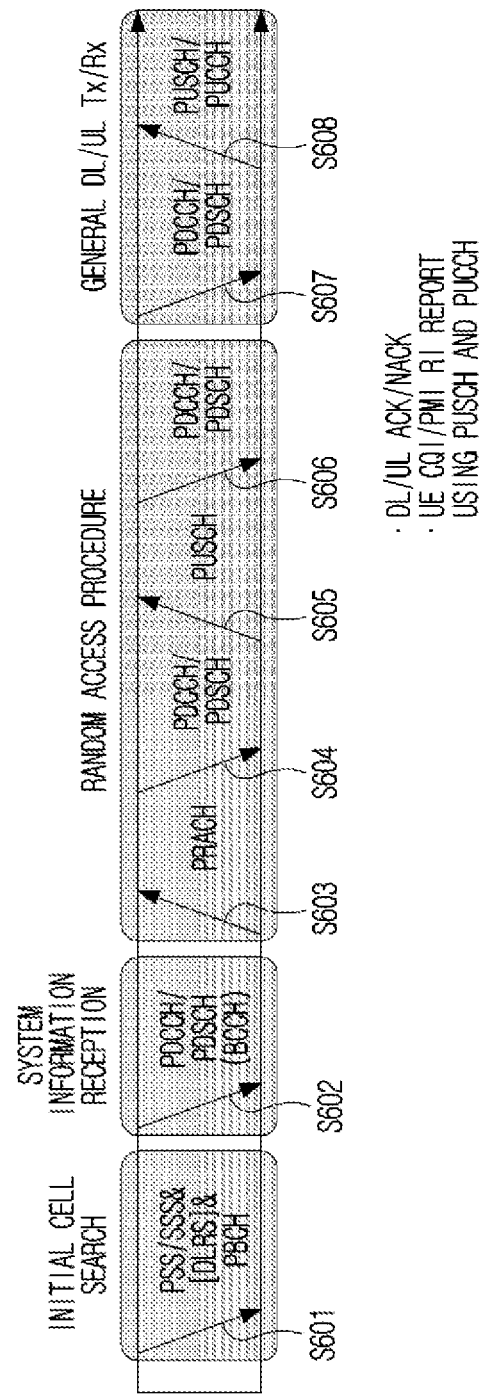
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Carrier Aggregation

A wireless communication system may support carrier aggregation (CA). For example, 3GPP LTE or NR system may support a wider UL/DL bandwidth by aggregating a plurality of uplink/downlink (UL/DL) component carriers (CCs). Each CC may be adjacent or non-adjacent to each other in the frequency domain. The bandwidth of each CC may be independently determined. Asymmetric carrier aggregation in which the number of UL CCs and the number of DL CCs are different is also feasible.

When carrier aggregation is applied, a specific one CC supporting fundamental operations may be referred to as a primary CC (PCC), and at least one additional CC may be referred to as secondary CC (SCC). For one CC, only UL may be configured, only DL may be configured, or UL and DL may be configured.

A control channel (e.g., PDCCH) including scheduling information for transmission and reception of UL/DL data channel (e.g., PUSCH/PDSCH) in a specific CC may be transmitted in the corresponding specific CC. Such operation may be referred to as self-carrier scheduling (or simply self scheduling), to distinguish such operation from cross-carrier scheduling (CCS) (or simply cross scheduling), which will be described hereinafter.

When cross-carrier scheduling (CCS) or cross scheduling is applied, for example, a PDCCH for downlink assignment may be transmitted on DL CC #0, and the corresponding PDSCH may be transmitted on DL CC #2. For CCS, a carrier indicator field (CIF) may be used. The configuration for the presence or absence of CIF in the PDCCH (or DCI)

may be semi-statically enabled or disabled by a terminal-specific (or terminal group-specific) higher layer signaling (e.g., RRC signaling).

When the CIF is disabled, the PDCCH on a DL CC may allocate a PDSCH resource on the same DL CC or a PUSCH resource on one UL CC linked to the same DL CC. In this case, the CIF may not be included in the DCI.

When the CIF is enabled, the PDCCH on a DL CC may allocate a PDSCH or PUSCH resource on one DL/UL CC indicated by the CIF among a plurality of aggregated DL/UL CCs. In a DCI format including CIF, the CIF field having an x-bit (e.g., x=3) size may have a fixed position in DCI regardless of the DCI format size.

When the CIF is present/applied, the base station may allocate a monitoring DL CC (or DL CC set) to lower the PDCCH blinding decoding (BD) complexity at the terminal side. For PDSCH/PUSCH scheduling, the terminal may perform detection/decoding of PDCCH only in the corresponding DL CC (set). In addition, the base station may transmit the PDCCH only through the monitoring DL CC (set). The monitoring DL CC set may be configured in a terminal-specific, terminal-group-specific or cell-specific manner.

For example, it is assumed that three DL CCs are aggregated, and DL CC A is configured as a PDCCH monitoring CC. When CIF is disabled, each DL CC may transmit only PDCCH scheduling its own PDSCH (i.e., self-carrier scheduling). When CIF is enabled by terminal-specific (or terminal-group-specific or cell-specific) higher layer signaling, a specific CC (e.g., DL CC A) may transmit, using the CIF, a PDCCH scheduling the PDSCH of another DL CC as well as a PDCCH scheduling the PDSCH of the DL CC A (i.e., cross-carrier scheduling). PDCCH may not be transmitted in DL CCs B and C.

Definitions of terms related to a cell in the present disclosure are as follows. In the present disclosure, a cell may be interpreted according to a context, and may mean, for example, a serving cell. In addition, a cell may consist of one DL CC and 0 to 2 UL CCs. For example, a cell may consist of one DL CC and one UL CC.

For a terminal in which carrier aggregation (CA) is configured, primary cell (PCell) corresponds to a cell operating on a primary frequency (i.e., a frequency in which a terminal performs establishment/re-establishment for initial access), For a dual connectivity (DC) operation, a cell operating on a primary frequency among a master cell group (MCG) corresponds to a primary cell.

For a terminal in which carrier aggregation (CA) is configured, a secondary cell (SCell) corresponds to a cell that provides an additional radio resource to the SpCell.

For DC operation, primary secondary cell (PSCell) (or primary SCG cell) corresponds to a cell in which a terminal performs a random access when the terminal performs reconfiguration along with the synchronization procedure in the secondary cell group (SCG).

For DC operation, the special cell (SpCell) refers to a PCell of MCG or PSCell of SCG. For non-DC operation, SpCell refers to PCell.

For a terminal in the RRC_CONNECTED state in which CA/DC is not configured, there is only one a serving cell (ServCell), and the corresponding cell corresponds to the primary cell. For a terminal in RRC_CONNNECTED state in which CA/DC is configured, the serving cells refer to a set of cells including SpCell(s) and all SCells.

Addition/change to the list of SCells may be configured for a terminal through a higher layer (e.g., RRC) signaling. Accordingly, one or more SCells may be configured for the terminal. Based on one or more SCells configured for the terminal, the network may indicate activation/deactivation of the configured SCell(s). SCell activation/deactivation of the terminal may be performed based on SCell activation/deactivation MAC CE, a predetermined timer, or an indication of SCell state provided along with SCell configuration.

Enhanced SCell Activation

For performing large-capacity data transmission/reception using the extended bandwidth through a new SCell based on CA/DC, as described above, it is required that SCell(s) are first configured (e.g., added/changed) for the terminal, and thereafter, a procedure of activation related to the configured SCell(s) is performed.

Immediately after activating the SCell, performing data scheduling and data transmission/reception (e.g., PDSCH/PUSCH scheduling through DCI and PDSCH/PUSCH transmission/reception) between the network and the terminal on the corresponding SCell may not be available. For example, prior to data transmission/reception on the activated SCell, it may be required to perform synchronization and tracking to minimize errors. For example, the terminal may perform a fine tracking based on a predetermined reference signal (RS) after receiving the SSB. Furthermore, the terminal may transmit to the network feedback (e.g., CSI report) based on RS from the network.

The present disclosure describes various examples for supporting/performing faster SCell activation. For example, the present disclosure includes embodiment 1 related to a method for allowing the terminal to fast receive an RS for tracking purpose (in the following description, a temporary RS for tracking purposes is referred to as "TRS"), embodiment 2 related to a method for fast reporting feedback on downlink channel state, embodiment 3 related to a method of reducing the time of the overall procedure from SCell activation to CSI feedback, embodiment 4 related to a method of efficiently applying QCL information of TRS.

Figure 7:
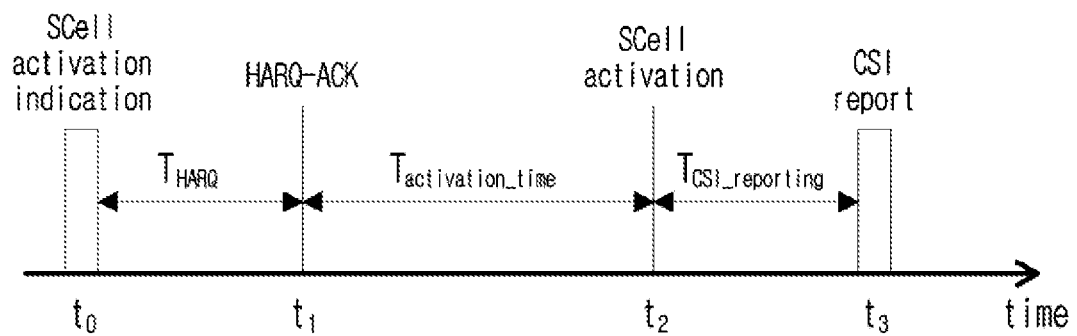
FIG. 7 is a diagram illustrating durations of SCell activation operation related to the present disclosure.

FIG. 7 is a diagram illustrating durations of the SCell activation operation related to the present disclosure.

In FIG. 7, the horizontal axis corresponds to time, and a time point at which an SCell activation indication/command is received (or a time point at which the base station transmits an SCell activation indication/command) may be referred to as to. Specifically, activation for the specific SCell may be signaled/indicated through the MAC CE for the specific SCell transmitted in the PCell (or another SCell that has already been activated).

For the PDSCH including the MAC CE, the terminal may transmit HARQ-ACK information to the network. The time point of transmitting HARQ-ACK information by the terminal (or the time point of receiving HARQ-ACK information by the base station) may be referred to as $t_1$. For example, the HARQ-ACK information may include ACK information for a success in PDSCH decoding, and NACK information for a failure. The length (or duration) of a time portion required for the terminal to receive the PDSCH, attempt to decode it, and transmit HARQ-ACK information may be referred to as $T_{HARQ}$.

Next, the terminal may prepare to perform transmission/reception on the corresponding SCell based on information indicated by the SCell activation MAC CE. A time point at which transmission/reception preparation is completed on the SCell indicated to be activated may be referred to as $t_2$. For example, the terminal may perform synchronization through SSB reception on the activated SCell, preparing CSI-RS reception with frequency configuration and automatic gain control (AGC) preparation or the like, and the length of a time portion therefor may be referred to as $T_{activation\_time}$.

Lastly, the terminal may perform a CSI report. The CSI report of the terminal may not be essential. The transmission time point of the CSI report by the terminal (or the reception time point of the CSI report by the base station) may be referred to as $t_3$. For example, the terminal may transmit the CSI report in the uplink by performing CSI-RS measurement, channel estimation, CSI calculation, or the like. The length of the time portion for performing the above may be referred to as $T_{CSI\_Reporting}$.

Accordingly, the total length of time from when the terminal receives the SCell activation indication and transmits the CSI report for the first time may be $T_{HARQ}+T_{activation\_time}+T_{CSI\_Reporting}$.

The present disclosure mainly describes methods of efficiently signaling/indicating to a terminal various information such as RS related information or the like, for reducing the length of the $T_{activation\_time}$ duration and/or reducing the length of the $T_{CSI\_Reporting}$ duration.

Figure 8:
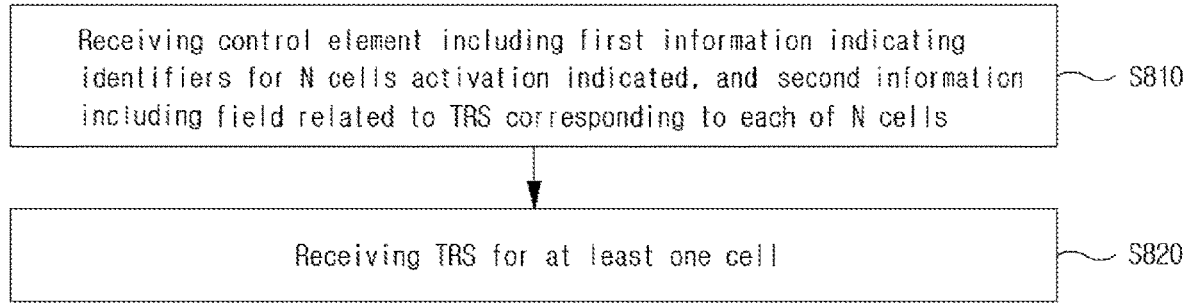
FIG. 8 is a diagram illustrating an example of a method for receiving a reference signal by a terminal according to the present disclosure.

FIG. 8 is a diagram illustrating an example of a method for receiving a reference signal of a terminal according to the present disclosure.

In step S810, the terminal may receive a control element indicating cell activation from the base station.

The control element may include first information indicating identifiers for N (N is an integer greater than or equal to 1) cells for which activation is indicated. For example, among M (M is an integer greater than or equal to N) cells (e.g., SCells) configured for the terminal (e.g., added/changed through higher layer signaling), activation of N cells may be indicated. That is, the control element may indicate that the cell (or SCell) corresponding to the indicated identifier/index is activated by including information on the cell identifier (or cell index) for each of the N cells.

The control element may further include a field related to TRS (hereinafter, TRS-related field) corresponding to each of the N cells. The number of TRS-related fields may be equal to N, which is the number of cells for which activation is indicated. That is, one TRS-related field may correspond to one cell for which activation is indicated.

The TRS-related field may indicate the identifier of the TRS. For example, the identifier of the TRS may indicate the configuration of the TRS (i.e., CSI-RS used for tracking purposes). One or more CSI-RS configurations may be provided (e.g., pre-configured through higher layer signaling) to the terminal, and among them, specific CSI-RS configuration(s) may be pre-configured to be used for tracking purposes related to cell activation. The TRS configuration (i.e., corresponding to the CSI-RS configuration) provided in this way may include various configuration parameters such as CSI-RS/TRS resource, periodicity, offset, and QCL information. That is, the TRS configuration may be specified through the identifier of the TRS.

The TRS-related field may indicate a TRS identifier for a cell for which activation is indicated or may indicate that TRS is not used. TRS not used for a cell for which activation is indicated may mean that TRS is not triggered or TRS is not configured. The indication that the TRS is not used may include that the TRS-related field indicates a 0 (zero) value or a null state.

As such, the control element indicating cell activation may be generated/provided/received/processed in the form of MAC CE by the MAC layer, based on the configuration (e.g., SCell addition/change configuration) for the cell signaled by the higher layer (e.g., RRC), or the configuration (e.g., CSI-RS configuration, or CSI-RS configuration configured for the purpose of TRS related to cell activation) for the TRS.

In step S820, the terminal may receive TRS for one or more cells.

Here, one or more cells may be some or all of the N cells for which activation is indicated. That is, among the cells for which activation is indicated, the TRS indication or trigger may be applied to a certain cell, and the TRS indication or trigger may not be applied to other cells.

The terminal may receive the TRS for one or more cells in an aperiodic manner, and information required for the reception of the TRS may be based on the CSI-RS/TRS configuration indicated by the TRS-related field.

Figure 9:
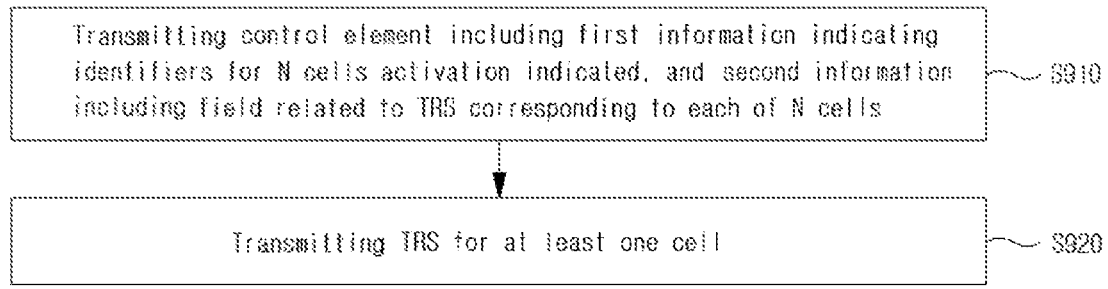
FIG. 9 is a diagram illustrating an example of a method for transmitting a reference signal by a base station according to the present disclosure.

FIG. 9 is a diagram illustrating an example of a reference signal transmission method of a base station according to the present disclosure.

In step S910, the base station may transmit a control element indicating cell activation to the terminal.

Here, the description related to the control element indicating cell activation is the same as those described with reference to step S810 of FIG. 8, a redundant description will be omitted.

In step S920, the base station may transmit a TRS for one or more cells to the terminal.

The description related to one or more cells and the configuration for TRS transmission or reception are the same as those described with reference to step S820 of FIG. 8, a redundant description will be omitted.

Detailed examples of the reference signal transmission/ reception method for fast cell activation described with reference to FIGS. 8 and 9 will be described hereinafter. In addition, although not shown in FIGS. 8 and 9, CSI report transmission/reception related to cell activation may be additionally performed, and detailed examples thereof will be described hereinafter.

Embodiment 1

The present embodiment relates to a method in which the terminal fast receives the TRS, or the base station supports the same. For example, a method for fast and efficiently performing activation of the SCell configured for the terminal and preparation for reception on the SCell will be described.

The terminal may receive an activation command for an (not activated) SCell through the MAC CE in the PCell (or any already activated SCell). For the SCell(s) indicated by the activation command, the terminal may prepare for reception from the start (i.e., $t_1$ in FIG. 7) of the $T_{activation\_time}$ duration. Here, the preparation for reception may include that the terminal prepares to correctly perform reception and decoding of a physical channel (e.g., PDCCH or PDSCH) including information transmitted from the base station, by utilizing reception-related information (e.g., SSB, frequency, CSI-RS resource, etc.) included in the RRC configuration message related to SCell addition/change. For example, the $T_{activation\_time}$ duration may include a time for performing synchronization of the terminal with the base station based on SSB, AGC, frequency synchronization, preparation for reception and measurement of a channel, or the like, and additionally include a predetermined offset corresponding to the processing time of the transition for the previous operation and the next operation or the like.

To shorten the time duration of this portion, a method for allowing the terminal to fast perform measurement on channel reception may be considered. For example, by triggering a reference signal (e.g., TRS) such as a CSI-RS resource in a terminal-specific (or terminal-dedicated) manner together with an SCell activation command, the terminal may perform fast accurate time tuning and reception channel analysis through the reference signal. For example, the TRS may be transmitted aperiodically or via at least one burst. One burst may correspond to a unit in which one or more transmissions (e.g., 2-4 transmissions) are performed during a predetermined time duration. Additionally, the terminal may perform CSI reporting based on TRS, and the CSI reporting time may be advanced as much as the TRS trigger is performed at an earlier time.

Specific details of the TRS trigger will be described below. For example, triggering information for TRS transmission may be provided/indicated for each SCell(s) for which activation is indicated. A signaling/indicating scheme for this may be defined by a combination of one or more of the following examples A-G.

Example A. A set of parameters (e.g., RS transmission resources, QCL related information, etc.) for plurality of (candidate) TRS may be configured for each SCell through RRC signaling in advance.

Example B. With respect to the activated SCell(s) (except the deactivated SCell(s)), sequentially according to the cell index order, whether TRS being transmitted or not for each cell and RS parameter information may be indicated. Here, separate cell index indication information for the SCell that is the target of TRS triggering may be omitted.

Example C. TRS triggering information and information indicating SCell activation may be included in the same single MAC CE, or included in separate MAC CEs but may be transmitted through the same PDSCH. When included in separate MAC CEs, only for the SCell(s) for which activation is indicated (except for the SCell(s) for which deactivation is indicated) through the SCell activation MAC CE, sequentially according to the cell index order, whether TRS being transmitted or not for each cell and RS parameter information may be indicated through the TRS triggering MAC CE. Here, separate cell index indication information for the SCell that is the target of TRS triggering on the RS triggering MAC CE may be omitted.

Example D. TRS transmission timing information (e.g., triggering offset, triggering slot offset, etc.) may be indicated as a common timing for all SCells for which TRS is triggered, or may be individually indicated for each SCell (or TRS). When individual timing information is indicated for each SCell (or TRS), the corresponding timing information may be included in an RS parameter set configured through RRC signaling in advance.

Example F. For indication of TRS trigger information, one or more bit-sized field/information may be defined. For example, when 3-bit information is allocated per cell, the TRS trigger information may indicate one of eight states. For example, each of the eight states may indicate a TRS identifier or may indicate no TRS (e.g., null or 0). For example, 8 states may include {no TRS, RS ID #a1, RS ID #a2, RS ID #a3, RS ID #a4, RS ID #a5, RS ID #a6, RS ID #a7}. When 4 TRS IDs from 1 to 4 are configured for the corresponding SCell, they are mapped as a1=1, a2=2, a3=3, a4=4 (in this case, TRS corresponding to RS ID #a5/a6/a7 is not present), and when 1 to 10 are configured, the lowest 7 indices among them may be mapped to a1-a7. Alternatively, each mapping information such as an ID corresponding to a1 and an ID corresponding to a2 may be preconfigured by RRC signaling. Also, a reserved bit may be added to match the octet unit. In various examples to be described below, the size of the reserved bit R may be 1 bit to 7 bits.

Example G. The existing MAC CE for SCell activation/deactivation indication may be referred to as (legacy) SCell activation/deactivation MAC CE, and the MAC CE including TRS information/field proposed in this disclosure may be referred to as a name (e.g., enhanced SCell activation/deactivation MAC CE) distinct from (legacy) SCell activation/deactivation MAC CE. For example, a terminal supporting 3GPP standard Release-17 (R-17) may apply legacy and enhanced MAC CEs separately, or may follow the enhanced MAC CE.

FIG. 10 is a diagram illustrating various examples of MAC CEs indicating SCell activation and TRS information according to the present disclosure. Examples below will be described with reference to FIG. 10.

Embodiment 1-1

The present embodiment is related to a method of defining a new MAC CE, and simultaneously providing information related to SCell activation and TRS trigger on one single message.

The example of FIG. 10 (a) corresponds to an example of the MAC CE configuration according to the present embodiment.

For example, for each SCell, MAC CE including Y-bit information indicating the SCell index (or ID), and Z-bit information indicating the TRS ID (or index) may be defined.

Z-bit information may indicate which of a plurality of TRS IDs is transmitted or no TRS is transmitted. A specific state indicating that TRS is not transmitted may correspond to "no TRS triggering", null, or 0 (zero).

The sum of Y and Z bits may be configured as 8 bits or less. One octet including Y-bit information and/or Z-bit information may be allocated/mapped for each SCell.

Information on different SCells may be separately allocated/mapped to different octets.

For such MAC CE, a new MAC logical channel ID (LCID) field value different from the existing MAC CE may be applied.

MAC CE may include a field for the SCell index (or ID) in which activation is indicated, and a field indicating the ID (or index) of the TRS (resource) triggered for the corresponding SCell among CSI-RS resources (e.g., candidate resource related lists of TRS) preconfigured by RRC. The position of each RS, the number of transmissions, transmission time, QCL related information, or the like may be included in the TRS lists provided when adding/changing SCell in RRC. In the example of FIG. 10(a), one octet may be configured to include 4 bits of activation information for one SCell, and 3 bits of TRS information. In the example of FIG. 10(a), the bit corresponding to $C_0$ may be reserved.

In the case of a plurality of SCell activation, a plurality of octets may be included in the MAC CE. One octet may include one SCell ID and a TRS ID triggered for the corresponding SCell. The number of octets included in one MAC CE may be variable according to the number of SCells for which activation is indicated at the same time.

The example of FIG. 10(b) corresponds to a modified example of the MAC CE configuration.

For example, for each SCell, MAC CE including X-bit information indicating whether TRS being triggered or not (or on-off), Y-bit information indicating the SCell index (or ID), and Z-bit information indicating TRS ID (or index) may be defined.

X-bit information may indicate whether TRS is transmitted, and Z-bit information may indicate which of a plurality of TRS IDs is transmitted. For example, the X-bit may be defined as 1-bit and if its value is 1, it may indicate that TRS is triggered, and if the value is 0, it may indicate that TRS is not triggered (or no TRS triggering, or null state).

The sum of X, Y, and Z bits may be configured as 8 bits or less. One octet including X-bit information, Y-bit information, and/or Z-bit information may be allocated/mapped for each SCell.

Information on different SCells may be separately allocated/mapped to different octets.

For such MAC CE, a new MAC LCID field value different from the existing MAC CE may be applied.

In the example of FIG. 10(b), one octet may be configured to include 1 bit (e.g., a field named T) indicating whether TRS being triggered or not, 4 bits of activation information for one SCell, and 2 bits of TRS information. In the example of FIG. 10(b), the bit corresponding to $C_0$ may be reserved.

In the case of a plurality of SCell activation, a plurality of octets may be included in the MAC CE. One octet may include information related to whether TRS being triggered or not, one SCell ID and a TRS ID triggered for the corresponding SCell. The number of octets included in one MAC CE may be variable according to the number of SCells for which activation is indicated at the same time.

Embodiment 1-2

The present embodiment relates to a method of indicating the TRS ID in the additional octet only for the SCell for which SCell activation is indicated.

The example of FIG. 10(c) corresponds to an example of the MAC CE configuration according to the present embodiment.

For example, SCell activation/deactivation may be indicated through the value of the bit position in the bitmap of cell indices ($C_1$ to $C_7$, or $C_1$ to $C_{31}$), analogously with the existing SCell activation/deactivation MAC CE.

An additional octet for the corresponding MAC CE may be defined, and the additional octet may include TRS ID information. The added TRS ID information may be included only for each of the activated SCell(s), and may not be included for the SCell for which activation is not indicated. Alternatively, TRS information for the SCell for which activation is indicated may be indicated through a MAC CE separate from the corresponding MAC CE.

When the SCell activation indication and the TRS ID are included in one MAC CE, one bit (e.g., a field named P) indicating whether the TRS ID indication field is added (or present) may be defined.

TRS ID information may be included continuously or sequentially only for the activated SCell. As in the example of FIG. 10(c), activation for $C_1$, $C_4$, and $C_7$ may be indicated among the SCell indices of $C_1$-$C_7$. The first TRS ID field may indicate the TRS ID triggered for SCell index 1 (i.e., $C_1$), the second TRS ID field may indicate the TRS ID triggered for SCell index 4 (i.e., $C_4$), and the third TRS ID field may indicate the TRS ID triggered for SCell index 7 (i.e., $C_7$).

The size of the TRS ID field is illustrated as 3 bits, but may be smaller or larger than that. One TRS ID field (e.g., RS ID field for SCell 7) may be defined across two octets. When a plurality of TRS ID fields do not form one octet, one or more additional R bits may be applied to match the octet unit.

For such MAC CE, a new MAC LCID field value different from the existing MAC CE may be applied. Alternatively, the same LCID value as the existing SCell activation/deactivation MAC CE may be applied.

Unlike the SCell index corresponding to the state value of the SCell index field in embodiment 1-1, in embodiment 1-2, each bit position may correspond to a different SCell index according to the SCell index bitmap. That is, embodiment 1-2 may be defined in a manner of adding a field for TRS ID in the existing SCell activation/deactivation MAC CE.

The addition/presence of the TRS ID may be indicated by the value of the P field. For example, if the value of the P field is 1, it may indicate that one or more TRS ID fields are present, and if the value is 0, it may indicate that the TRS ID field is not present. The bit position of the P field is exemplary, and the P field may be located at the highest SCell index (e.g., $C_7$) side.

Alternatively, even when P field is not defined (e.g., when the P field position is defined as an R bit), it may be defined that, when the activated SCell index is not indicated (e.g., when all $C_1$-$C_7$ are 0 values), a TRS ID field is not present, and when at least one SCell index is indicated of activation, a TRS ID field is present.

Embodiment 1-3

The present embodiment is related to a method of indicating the TRS ID in the additional octet for all SCells regardless of whether the activation.

The example of FIG. 10(d) corresponds to an example of the MAC CE configuration according to the present embodiment.

For example, SCell activation/deactivation may be indicated through the value of the bit position in the bitmap of cell indices ($C_1$ to $C_7$, or $C_1$ to $C_{31}$), analogously with the existing SCell activation/deactivation MAC CE.

An additional octet is defined for the corresponding MAC CE, and the additional octet may include TRS ID information. The added TRS ID information is included for each of all configured SCell(s), and TRS ID information may be added regardless of whether the corresponding SCell is activated. Alternatively, TRS information for the configured SCell(s) may be indicated through a MAC CE separate from the corresponding MAC CE.

When the SCell activation indication and the TRS ID are included in one MAC CE, one bit (e.g., a field named P) indicating whether the TRS ID indication field is added (or present) may be defined. In this case, the same LCID value as the existing SCell activation/deactivation MAC CE may be applied.

TRS ID information may be included continuously or sequentially for all configured SCells. TRS ID information for the non-configured (or not added) SCell index or the non-activated SCell, may be indicated as no TRS triggering, null, or zero value.

In the example of FIG. 10(d), one TRS ID field is defined as 4-bit size, and when 7 TRS ID fields for 7 SCells are included, the last 4 bits may be configured as R bits.

In the above examples, the TRS ID field may indicate an ID for TRS-related information (e.g., TRS parameter set) preconfigured by RRC, and may include TRS-related information indicated through MAC CE. For example, TRS-related information may be explicitly or implicitly indicated to the terminal. More specifically, the TRS-related information may include a time/frequency resource position, a TCI state, an SSB in a QCL relationship, the number of bursts, a time offset (or transmission time point-related information), or the like. Some or all of such TRS-related information may be configured in advance through RRC signaling, and others or all of the information may be indicated to the terminal through MAC CE. When some or all of the TRS-related information is transmitted through the MAC CE, the bit length of the TRS ID field (or the SCell RS ID field) may be increased in examples of the present disclosure.

Embodiment 2

The present embodiment relates to a method in which the terminal fast reports feedback on the downlink channel state, or the base station supports the same.

For example, by fast performing CSI reporting related information and triggering, the length of the $T_{activation\_time}$+$T_{CSI\_Reporting}$ portion in the example of FIG. 7 may be reduced. To fast perform CSI reporting, a combination of one or more of the following examples A-H may be applied.

Basically, information on TRS triggering, and/or information on CSI-RS triggering additional to TRS may be provided/indicated through MAC CE for each of the SCell (s) for which activation is indicated. In addition, information related to CSI reporting based on the triggered TRS and/or CSI-RS (or based on measurement for TRS and/or CSI-RS) may be indicated through the MAC CE.

Example A. A set of parameters (e.g., RS transmission resources, QCL related information, etc.) for plurality of (candidate) TRS and/or a plurality of (candidate) CSI-RS may be configured for each SCell through RRC signaling in advance.

Example B. For the activated SCell(s), in addition to whether being transmitted or not, RS parameter information, and triggering offset information for TRS and/or CSI-RS for each SCell, the following information may be indicated. Information that may be additionally indicated may include whether CSI report being transmitted or not (e.g., CSI request information) based on measurement for RS (e.g., TRS and/or CSI-RS), UL (e.g., PUCCH or PUSCH) resources for CSI report transmission (e.g., CSI UL resource information), CSI report transmission timing (e.g., CSI report timing information), or the like.

Example C. Information on whether CSI report being transmitted or not may be indicated commonly for all SCells for which the RS (e.g., TRS and/or CSI-RS) is triggered, or indicated individually for each SCell (or RS).

Example D. Information on UL resources for CSI report transmission may be indicated commonly for all SCells for which CSI reporting is indicated, or indicated/configured individually for each SCell (or RS).

Example E. Information on CSI reporting timing may be indicated commonly for all SCells for which CSI reporting is indicated, or indicated/configured individually for each SCell (or RS). For example, information on CSI reporting timing may be indicated/configured as a relative offset (or slot offset) from RS (e.g., TRS and/or CSI-RS) transmission timing, or indicated/configured as a relative offset (or slot offset) from a timepoint of a triggering offset=0.

Example F. TRS and/or CSI-RS triggering information and corresponding CSI reporting information may be included in the same single MAC CE, or included in separate MAC CEs but may be transmitted through the same PDSCH.

Example G. The RRC configuration for the TRS may include information related to the CSI reporting configuration. When CSI reporting configuration related information is not provided to the terminal, CSI reporting may not be performed.

Example H. Semi-persistent triggering or aperiodic triggering may be applied for CSI report. Semi-persistent CSI reporting triggering may be limited to performing CSI reporting only once.

Embodiment 2-1

The present embodiment relates to a method of applying TRS as a reference RS for CSI measurement, or indicating CSI-RS transmission triggering and CSI measurement/reporting operation based thereon through MAC CE related to TRS triggering.

When TRS-related triggering is indicated through MAC CE, TRS may be transmitted aperiodically or in a burst manner within a specific duration corresponding to $T_{activation\_time}$ after a predetermined time offset. Here, the TRS may be used as a reference RS for CSI measurement, and a reference RS of a CSI-RS preconfigured through RRC may be used for CSI measurement. To perform tracking (e.g., time tracking) through a general TRS or an aperiodic TRS, a modified form of the CSI-RS may be used. For example, tracking and CSI measurement/reporting may be performed based on TRS. Alternatively, tracking may be performed based on TRS and CSI measurement/reporting may be performed through triggering CSI-RS other than TRS.

Embodiment 2-2

The present embodiment is related to a method of triggering a CSI report through a TRS trigger-related MAC CE.

In the example of FIG. 10(a), MAC CE including Y-bit information for indicating the SCell index for each SCell, Z-bit information for indicating the TRS ID, and W-bit information for indicating triggering CSI reporting may be defined. In the example of FIG. 10(b), MAC CE including X-bit information indicating whether TRS is triggered or not (or on-off), Y-bit information indicating SCell index (or ID), Z-bit information indicating TRS ID (or index), and W-bit information for indicating CSI report triggering may be defined. Here, the W-bit information may be defined by utilizing the reserved bit (e.g., $C_0$ bit) in FIGS. 10(a) and 10(b).

When the Z-bit TRS ID field in the example of FIG. 10(a) or the X-bit T field in the example of FIG. 10(b) indicates "no TRS triggering" or a null state, CSI report may not be triggered either. Alternatively, even when TRS is not triggered, CSI measurement/reporting may be triggered based on an additional CSI-RS trigger.

In the example of FIGS. 10(a) and (b), W+X+Y bits or W+X+Y+Z bits may be configured with 8 bits or less. One octet configured as W-bit information, X-bit information, Y-bit information, and/or Z-bit information may be allocated/mapped for each SCell.

Information on different SCells may be separately allocated/mapped to different octets.

For such MAC CE, a new MAC LCID field value different from the existing MAC CE may be applied.

In the above example, when the value of W-bit information related to CSI reporting trigger is 1, CSI reporting based on TRS (or aperiodic TRS) is triggered, and when the value is 0, CSI reporting may not be triggered. Alternatively, when the value of W-bit information is 1, CSI reporting based on CSI-RS triggered through MAC CE triggering TRS is triggered, and when the value is 0, CSI reporting may not be triggered.

Additionally or alternatively, instead of defining the W-bit information related to the CSI reporting trigger, a method in which the CSI report is triggered when the TRS is triggered in the Z-bit information indicating the TRS ID (or index), or a method in which CSI-RS for CSI reporting is triggered when TRS is triggered in Z-bit information may be applied.

In the example of FIGS. 10(a) and (b), an SCell index for SCell activation, a TRS ID, and whether CSI being reported or not may be simultaneously indicated by each octet.

In addition, when the TRS ID field instead of the CSI report triggering bit (e.g., the W-bit information described above) has a value of "no TRS triggering" or a null state (or a corresponding RS ID value), it may be defined that TRS and/or CSI-RS transmission is not triggered, and CSI reporting based on TRS and/or CSI-RS is not triggered either.

When the CSI report is triggered, the number of TRS transmissions (e.g., TRS transmission in burst manner) and/or information related to the corresponding CSI-RS resource, CSI reporting related uplink resources, information about transmission timing, or the like may be configured in advance between the base station and the terminal through RRC signaling, and, for example, corresponding information may be provided to the terminal when SCell is added/changed.

Even in the case of aperiodic RS (e.g., TRS and/or CSI-RS) trigger and CSI reporting trigger, CSI reporting may be performed through PUCCH, for one-time transmission, or repeated transmission of a limited number of times for the purpose of enhancing reliability such as URLLC, not for periodic repeated transmission. Relevant parameters for CSI reporting through PUCCH in this way may be provided through RRC signaling (e.g., CSI reporting related configuration) or may be provided through MAC CE (e.g., including additional information in the examples of FIG. 10(c) or (d)).

CSI report may be configured as aperiodic, or may be configured semi-persistent.

In the case of CSI reporting through PUSCH, information on transmission-related resource allocation and transmission time of the corresponding PUSCH may be provided in advance to the terminal through configuration/reconfiguration information in the RRC procedure for SCell-related addition/change.

Embodiment 2-3

The present embodiment relates to an additional method of triggering a CSI report through a TRS trigger-related MAC CE.

For example, CSI reporting may be triggered through a MAC CE such as the example of FIG. 10(c). For example, as shown in FIG. 10(c), one MAC CE including information on CSI reporting in addition to the bitmap indicating SCell activation and SCell RS (i.e., TRS) ID information may be defined. Alternatively, a MAC CE including TRS ID information and CSI report information may be defined separately from the MAC CE indicating a bitmap indicating SCell activation.

In the bitmap indicating SCell activation, a bit indicating whether additional information (e.g., TRS ID information and/or CSI report information) being present/added may be defined. For example, the $C_0$ bit previously defined as the R bit may be defined as the P field indicating whether additional information is present or not. In this case, the existing LCID may be reused identically or a new LCID may be assigned.

CSI reporting information may indicate that CSI reporting is not performed, or may indicate a specific index value related to CSI reporting. For example, by reusing information configured by the higher layer (e.g, CSI-AssociatedReportConfigInfo, SP CSI-RS resource set ID, maxNrOfSemiPersistentPUSCH-Triggers related information, etc. configured by RRC) in relation to the CSI request field included in DCI, contents indicated by CSI reporting information through MAC CE may be defined.

The size of the CSI report information may be 1 bit or more.

Figure 11:
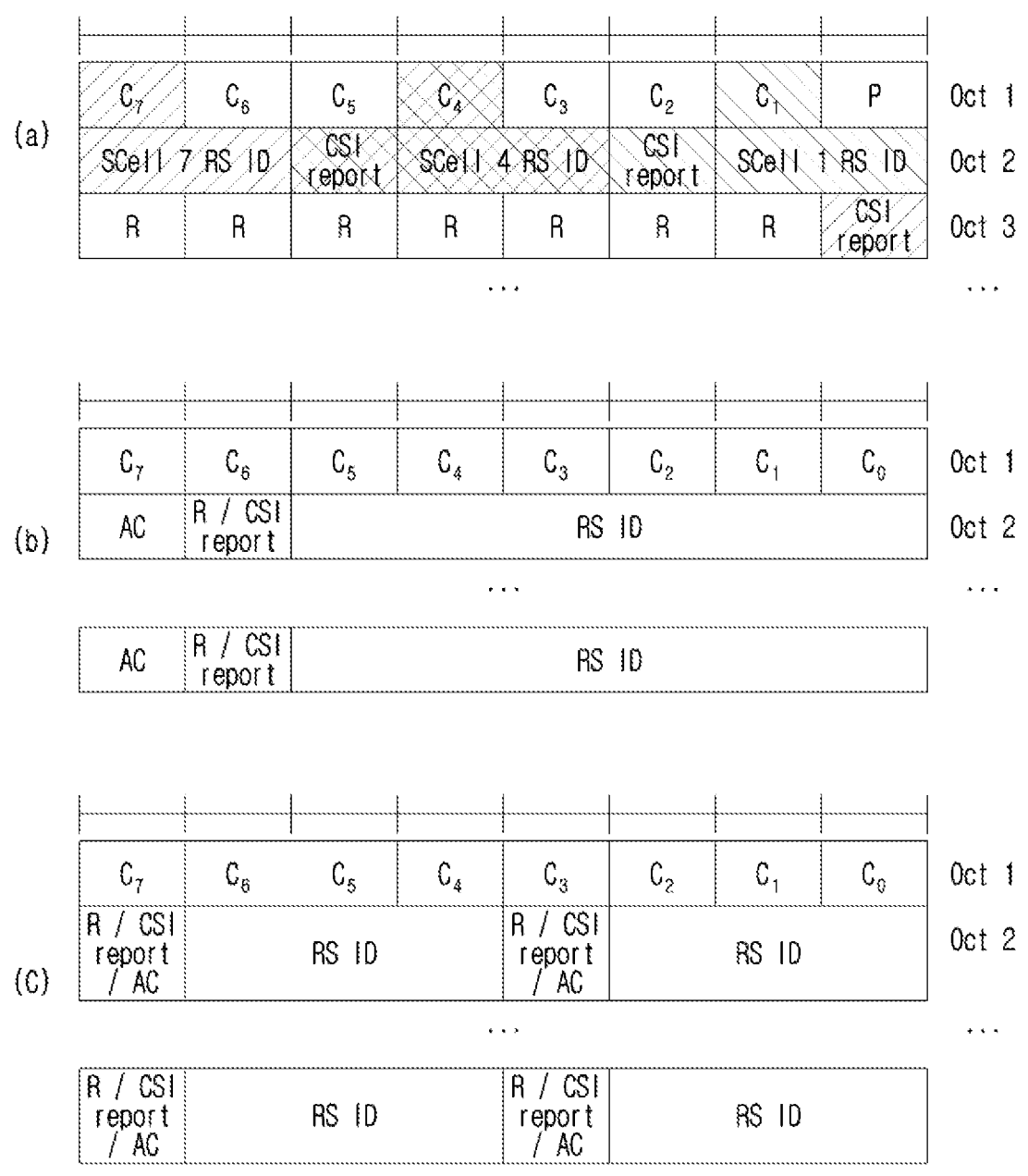

FIGS. 11 and 12 are diagrams illustrating various examples of MAC CE indicating SCell activation, TRS information, and/or CSI reporting according to the present disclosure.

The example of FIG. 11(a) may correspond to the MAC CE in which the above CSI report information is additionally reflected based on the example of FIG. 10(c).

For example, TRS information may be added for SCell Activation/Deactivation in the form of a bitmap, and triggering information related to CSI report transmission related to the corresponding CSI-RS may be added. The size of the SCell RS ID field corresponding to the TRS ID may be reduced to 2 bits compared to 3 bits in the example of FIG. 10(c), but the scope of the present disclosure is not limited thereto, and may be defined as a value of 3 bits or more. When the TRS ID field indicates no TRS triggering or a null state and is mapped as indicating that CSI reporting is also not triggered, the CSI report field is not separately defined or may be included in the TRS ID field.

In addition, information on PUCCH and/or PUSCH transmission related resource allocation and transmission timing for CSI report may be provided to the terminal through MAC CE. In this case, information bits may be consecutively connected together with TRS ID and/or CSI-RS (i.e., CSI-RS for CSI reporting) transmission triggering control associated with one SCell. For example, in the example of FIG. 11(a), indication information on a resource/time point, etc. may be added following the CSI report bit.

Information configured/indicated through RRC and/or MAC CE related to CSI reporting through PUCCH/PUSCH may include PUCCH/PUSCH related resource (e.g., time/frequency resource) information, transmission time (e.g., time offset, number of slots, slot number, etc.) related information, repeated transmission related information (e.g., number of times, period, etc.), or the like.

In embodiments 2-2 and 2-3, when the CSI report is received multiple times from the base station, information that enables/disables (or activates/deactivate) the CSI report by the base station may be defined in the form of MAC CE. Such CSI report disable-related MAC CE may be transmitted to the terminal on the SCell. For example, at time point $t_0$ of FIG. 7, the terminal may receive on the PCell a MAC CE for activating/triggering semi-persistent (SP) CSI reporting on the SCell. In addition, AGC, reception-related preparation, SSB-based synchronization, or the like may be performed in the duration between $t_1$ and $t_2$, and CSI reporting may be performed at a time point after $t_2$ (e.g., time point $t_3$). Upon receiving one or more CSI reports from the terminal, the base station may transmit on the SCell a MAC CE deactivating the SP CSI report on the SCell. In this case, it may be assumed that the TRS may be transmitted in aperiodic or semi-persistent manner.

When various examples described in this disclosure are applied compared to the example of FIG. 7, the length of each duration may be shortened or some operations may be overlapped or omitted (e.g., TRS/CSI-RS is triggered together with an SCell activation indication, instead of TRS/CSI-RS triggering and reception being performed after SCell activation).

Considering a case that a specific cell is a known cell for the terminal (e.g., mmwave, intra-contiguous CA, terminal having information about the cell, such as a previously connected cell), triggering for CSI reporting and TRS/CSI-RS transmission may not be provided. For example, in the case of mmwave, since L1-RSRP for SSB or the like is used through beam management, CSI reporting may not be required.

In the example of FIG. 11 (a), as in the example of FIG. 10 (c), TRS ID information may be indicated only for the activated SCell, and since the number of octets included in the MAC CE is variable, the transmission overhead may be reduced.

Examples of FIG. 11 (b) to FIG. 12(b) correspond to modified examples of MAC CE indicating TRS ID information and CSI reporting for all SCell (i.e., not limited to the activated SCell). Unlike the example of FIG. 11(b) to FIG. 12(b), the MAC CE including the TRS information and CSI report information for the SCell may be defined separately from the MAC CE indicating whether SCells being activated or not.

In the example of FIGS. 11(b) and (c), 1-bit information indicating whether the octet(s) is present/added to the SCell activation MAC CE may be included. In addition, 1-bit information indicating whether TRS being triggered or not and 1-bit information indicating whether CSI reporting being triggered or nor may be included. Whether CSI reporting being triggering or not may be mapped to whether TRS being triggered or not (e.g., CSI reporting is not triggered when no TRS triggering is indicated), so a separate field for whether CSI reporting being triggered or not may not be defined. For such MAC CE, a distinct LCID value may be defined or the same LCID value may be applied.

In the example of FIG. 11(b), the AC field may indicate whether the RS ID field being present or not in the octet corresponding to Ci (cell index) corresponding to the activated cell. It may indicate that, when the value of the AC field is 1, the candidate RS ID field is present, and when the value is 0, the R field is present instead of the RS ID field. In addition, when the AC field is 0, it may indicate that there is no octet added thereafter. In the example of FIG. 11(b), the R field may be replaced with a field indicating whether CSI reporting being triggered or not. It may indicate that when the value of the CSI report field is 1, CSI reporting is triggered for the SCell corresponding to Ci, and when the value is 0, CSI reporting is not triggered for the SCell corresponding to Ci.

In the example of FIG. 11(c), the R field may be replaced with a field indicating whether CSI reporting being triggered or not. It may indicate that, when the value of the CSI report field is 1, CSI reporting is triggered for the SCell corresponding to Ci, and when the value is 0, CSI reporting is not triggered for the SCell corresponding to Ci. Alternatively, the R/CSI report field may be replaced with an AC field (refer to the description of FIG. 11(b)).

In the example of FIG. 12(a), one of the two R fields of one octet may be replaced with a field indicating CSI reporting. The remaining one R field may be replaced with an AC field. Descriptions of the AC field and the CSI report field are the same as those of the AC field and the CSI report field in the examples of FIGS. 11(b) and (c).

In the example of FIG. 12(b), the RS ID field may be present for Ci corresponding to the activated cell. When the activation/deactivation of the SCell and the RS ID are configured as separate octets, the Ci field may be replaced with information indicating for which SCell CSI reporting is triggered, or may be mapped to the corresponding information.

In addition, although there is no triggering for the TRS of the SCell, CSI reporting may be triggered, and in this case, the TRS ID bit may indicate 0 or no TRS triggering or null state.

Embodiment 3

The present embodiment relates to a method for reducing the time of the overall procedure from SCell activation to CSI feedback of the terminal, and supporting the same by the base station.

For example, a method of reducing the overall time of $T_{HARQ}+T_{activation\_time}+T_{CSI\_Reporting}$ in the example of FIG. 7 will be described.

In the above-described embodiments, it is assumed that the base station receives HARQ-ACK information for the MAC CE including the SCell activation command, and then the terminal prepares in the corresponding SCell and receives the TRS and/or CSI-RS and reports CSI. The present embodiment relates to a method of simply and fast performing the start of whole triggering. For example, instead of reporting whether the terminal has successfully decoded the MAC CE (or the PDSCH carrying the same) including the SCell activation command to the base station through HARQ-ACK feedback, it may be reported to the base station through a CSI report. That is, the base station may determine whether the terminal has successfully decoded the MAC CE/PDSCH including the SCell activation command, based on whether a CSI report from the terminal is received.

In other words, when the SCell activation command, TRS triggering, CSI-RS triggering, and/or CSI reporting (based on TRS and/or CSI-RS) is indicated through a specific MAC CE/PDSCH, the terminal may omit transmission of a separate HARQ-ACK feedback for the corresponding MAC CE/PDSCH. The terminal may perform CSI reporting based on information indicated by the corresponding MAC CE/PDSCH.

Alternatively, when only SCell activation command, TRS triggering, and/or CSI-RS triggering is indicated through a specific MAC CE/PDSCH, and CSI reporting (based on TRS and/or CSI-RS) is not indicated, the terminal may perform HARQ-ACK feedback transmission for the corresponding MAC CE/PDSCH.

Hereinafter, a method of triggering SCell activation through DCI will be described. That is, unlike the method of indicating SCell activation through MAC CE as in the above-described examples, TRS for SCell may be triggered in advance, through PDCCH carrying DCI including CSI request related information on PCell (or any already activated SCell).

Without the SCell activation command through the MAC CE, the activated SCell may be indicated through a CIF (carrier indicator field), and may be activated in a cross-carrier scheduling scheme.

TRS triggering and CSI reporting triggering may be simultaneously indicated through triggering through the CSI request field included in the UL scheduling related DCI (e.g., DCI format 0 series).

TRS triggering may be performed through information included in DL scheduling related DCI (e.g., DCI format 1 series), and therethrough CSI-RS triggering and CSI reporting based thereon may be derived.

The base station may determine that the corresponding SCell is activated through the CSI report of the terminal.

Figure 13:
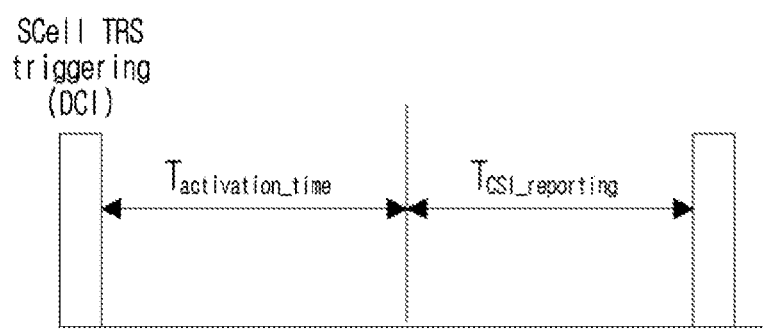
FIG. 13 illustrates an example of cross-carrier scheduling-based TRS triggering according to the present disclosure.

FIG. 13 illustrates an example of TRS triggering based on cross-carrier scheduling according to the present disclosure.

For example, the SCell to be activated may be indicated through the CIF field in the PCell (or SCell capable of cross-carrier scheduling of another SCell). The terminal may know which SCell is indicated for activation through the CIF field in the DCI. When there is no HARQ feedback for the MAC CE command, the base station may know whether the SCell of the terminal is activated only when the CSI report is correctly performed. Some information related to CSI reporting may be dynamically indicated through the DCI instead of configuring/indicating the same through RRC/MAC CE to the terminal, thereby reducing RRC/MAC CE transmission overhead. That is, by using the CIF field included in the UL scheduling related DCI format 0 series or the DL scheduling related DCI format 1 series, some or all of SCell activation, PUSCH/PDSCH scheduling, TRS triggering, CSI-RS triggering, CSI reporting triggering (based on TRS/CSI-RS) may be simultaneously indicated through DCI.

Embodiment 4

The present embodiment relates to a method in which the terminal efficiently applies the QCL information of the TRS, or the base station supports the same. For example, QCL-related information of TRS/CSI-RS may be utilized in the SCell activation process.

Figure 14:
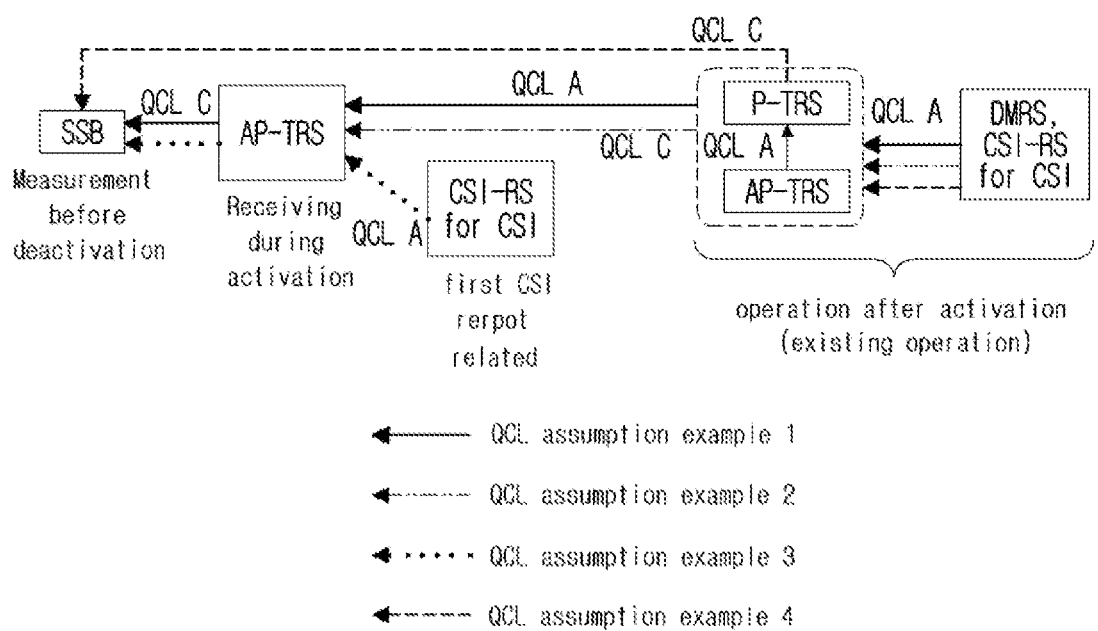
FIG. 14 is a diagram illustrating examples of TRS/CSI-RS related QCL assumptions in the fast SCell activation procedure according to the present disclosure.

FIG. 14 is a diagram illustrating examples of TRS/CSI-RS related QCL assumptions in the fast SCell activation procedure according to the present disclosure.

QCL source for TRS may be SSB. In addition, in the SCell activation procedure, the TRS may become a QCL source for another RS. For example, another RS may be DMRS, CSI-RS, periodic-TRS (P-TRS), SSB, or the like.

QCL assumption related to CSI-RS in fast SCell activation may be summarized as follows.

As in QCL assumption example 1, it may be assumed that the QCL source of another RS (DMRS, CSI-RS) is P-TRS, the QCL source of P-TRS is TRS (or AP-TRS), QCL source of TRS (or AP-TRS) is SSB.

As in QCL assumption example 2, the SSB may be omitted it may be assumed that the QCL source. For example, it may be assumed that the QCL source of another RS (DMRS, CSI-RS) is P-TRS, and the QCL source of P-TRS is TRS (or AP-TRS).

As in QCL assumption example 3, it may be assumed that the QCL source of the CSI-RS for the initial CSI report to complete the SCell activation is TRS (or AP-TRS), and the QCL source of the TRS (or AP-TRS) is SSB. Alternatively, the SSB may be omitted from the QCL source.

As in QCL assumption example 4, it may be assumed that the QCL source of another RS (DMRS, CSI-RS) is P-TRS, and the QCL source of P-TRS is SSB. This may correspond to a case where TRS (or AP-TRS) is not triggered.

In the example of FIG. 14, the CSI-RS related to the initial CSI report may not be indicated in the MAC CE or DCI. In addition, the indication for the AP-TRS-based TRS may also be omitted from the MAC CE.

In various examples of the present disclosure described above, the provision of SCell configuration (e.g., addition/change) for the terminal in the CA/DC situation corresponds to a state in which the terminal only stores information about the SCell in advance, and corresponds to a state in which actual transmission/reception operation on the SCell is not performed. The actual transmission/reception operation may be performed after receiving an activation command (e.g., MAC CE) for the SCell. With the development of a wireless communication system, a situation in which a lot of data needs to be suddenly transmitted/received in response to a requirement such as URLLC is considered, and for efficient data transmission/reception, a fast completion of SCell activation is required. Therefore, when a command for activating the SCell is provided from a higher layer when necessary, it is important to fast perform an operation for transmitting and receiving data through a radio resource. According to various examples of the present disclosure described above, since the TRS for the SCell is provided together with the SCell activation command, time tracking for the SCell may be completed fast, and CSI reporting may also be performed if necessary. Therefore, compared to the conventional method of triggering the RS after the SCell activation is completed, the SCell may be used efficiently and fast. Accordingly, even when transmission/reception of a large amount of data is suddenly required, a service for fast transmitting/receiving a large amount of data while minimizing delay may be implemented.

TRS-Related Configuration

Hereinafter, examples of the present disclosure for TRS-related configuration will be described. For example, information on the TRS-related configuration may be provided to the terminal from the network through higher layer (e.g., RRC) signaling. In addition, TRS transmission/reception and/or TRS-based CSI report transmission/reception may be performed through a predetermined indication/command based on the TRS-related configuration. Such TRS-related configuration/indication may include various examples in terms of TRS-related timing, TRS-based CSI report resource/number of times, and TRS-related QCL operation as described below.

The following examples may be applied in combination with embodiments 1 to 4 related to TRS triggering, CSI report triggering, or the like, associated with the aforementioned SCell activation. For example, the configuration for the TRS-related timing (e.g., TRS start offset, TRS burst gap) described below may be provided for the terminal, and when TRS triggering (with SCell activation) information in the above-described embodiment 1 is indicated to the terminal, the terminal may receive at least one TRS burst based on the start timing of the first TRS burst and/or the start timing of the subsequent TRS burst derived based on the TRS timing information. In addition, the terminal may perform a CSI report after receiving at least one TRS burst, or additionally or alternatively, may perform an uplink/downlink transmission/reception operation based on a QCL related to the TRS.

Figure 15:
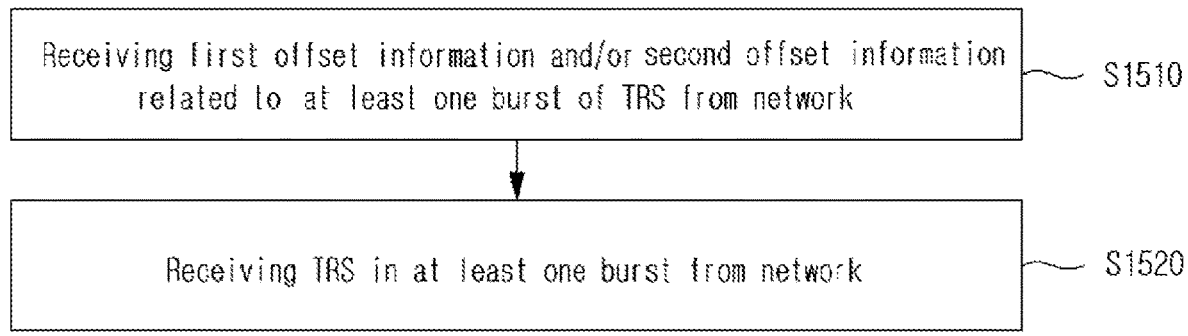
FIG. 15 is a diagram illustrating an additional example of a method for receiving a reference signal by a terminal according to the present disclosure.

FIG. 15 is a diagram illustrating an additional example of a method for receiving a reference signal of a terminal of the present disclosure.

In step S1510, the terminal may receive at least one of the first offset information or the second offset information for at least one burst of TRS from the network.

TRS may be received through one burst or a plurality of bursts.

For example, the first offset information may be for a first (or first in time domain) burst among at least one burst. For example, the first offset information may indicate a triggering offset value $offset_1$ based on a reference slot. Accordingly, the first (or first in the time domain) slot of the first burst may start at the $offset_1$-th slot after the reference slot. The reference slot may be expressed as slot n+k, and a detailed description thereof will be described below.

The second offset information may or may not be provided to the terminal. For example, when the second offset information is absent (e.g., a specific higher layer information element (i.e., a set of parameters) that may include the second offset information) does not include the second offset information), it may indicate (implicitly) that the number of TRS bursts is one. When the second offset information is present (e.g., when the specific higher layer information element includes the second offset information), it may indicate (implicitly) that the number of TRS bursts is a plurality (e.g., two), and also, the second offset information indicates an offset between the first burst and the second burst (or a gap between bursts). For example, the second offset information may indicate an offset value (offset$_2$) between the first burst and the second burst. Accordingly, the first (or first in the time domain) slot of the second burst may start at the offset$_2$-th slot after the end of the first burst. For example, when the second offset information is present, offset$_2$ may have a value of 2 or more.

For example, the first offset information and the second offset information may be included in the same higher layer (e.g., RRC) information element, or may be included in different information elements. For example, the first offset information (i.e., triggering offset) is included in the first RRC information element (e.g., NZP-CSI-RS-ResourceSet information element), and the second offset information (i.e., the gap between bursts) may be included in the second RRC information element (e.g., SCellActivationRs-Config information element).

Additionally or alternatively, the terminal may receive configuration information related to at least one TRS burst related timing, CSI report resource/number of time, QCL, or the like from the network, and specific examples thereof will be described below.

In step S1520, the terminal may receive a TRS from the network in at least one burst.

Step S1520 may include steps S810 and S820 of FIG. 8. That is, when the terminal receives the control element of S810 included in the step S1520 from the network, based on the configuration information such as the TRS reception timing received in step S1510 and the control element reception timing, or the like, the reception timing of the first TRS burst (additionally, the subsequent TRS burst) may be determined. Accordingly, the TRS may be received from the network in S820 included in the step S1520.

Figure 16:
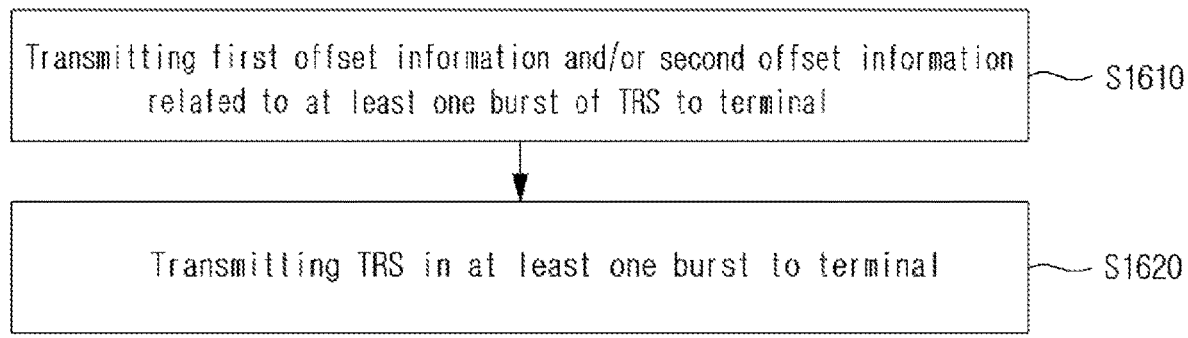
FIG. 16 is a diagram illustrating an additional example of a method for transmitting a reference signal by a base station according to the present disclosure.

FIG. 16 is a diagram illustrating an additional example of a reference signal transmission method of a base station according to the present disclosure.

In step S1610, the network may transmit at least one of the first offset information or the second offset information for at least one burst of TRS to the terminal.

Examples of the first offset information and the second offset information are redundancy of the description with reference to step S1510 of FIG. 15, and thus a detailed description thereof will be omitted.

Additionally or alternatively, the network may transmit configuration information related to timing related to at least one TRS burst, CSI report resources/number of times, QCL, or the like. to the terminal, and specific examples thereof will be described below.

In step S1620, the network may transmit TRS in at least one burst to the terminal.

Step S1620 may include steps S910 and S920 of FIG. 9. That is, the base station may provide the terminal with configuration information such as TRS reception timing in step S1610 in advance, and transmit the control element of S910 included in the step S1620 to the terminal. The base station may determine the transmission timing of the first TRS burst (additionally, the second TRS burst) based on the configuration information and the control element transmission timing. Accordingly, in consideration of the timing at which the terminal expects to receive the TRS burst(s) determined based on the configuration information and the reception timing of the control element, the base station may transmit the TRS in step S1620.

Hereinafter, specific examples of the present disclosure for TRS-related configuration will be described.

Embodiment 5

The present embodiment includes additional examples of TRS-related higher layer parameters. TRS-related higher layer (e.g., RRC) parameter contents may be associated or mapped to a TRS ID.

CQI-ReportConfigID (or identifier for CSI-ReportConfig) in the RRC layer may indicate a set of configuration information for a specific CQI/CSI report. That is, configuration information for PUCCH transmission may be provided to the terminal through the identifier for CSI-ReportConfig. For example, CSI-ReportConfig may be used to configure periodic or semi-persistent reports transmitted on PUCCH. An example of CSI-ReportConfig is shown in Table 6.

TABLE 6

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI).

CSI-ReportConfig information element

```
-- ASN1START
-- TAG-CSI-REPORTCONFIG-START
CSI-ReportConfig ::=            SEQUENCE {
    reportConfigId              CSI-ReportConfigId,
    carrier         ServCellIndex           OPTIONAL, -- Need S
    resourcesForChannelMeasurement          CSI-ResourceConfigId,
    csi-IM-ResourcesForInterference         CSI-ResourceConfigId        OPTIONAL, -- Need R
    nzp-CSI-RS-ResourcesForInterference     CSI-ResourceConfigId        OPTIONAL, -
```

TABLE 6-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI).

CSI-ReportConfig information element

```
- Need R
    reportConfigType         CHOICE {
        periodic             SEQUENCE {
            reportSlotConfig                    CSI-ReportPeriodicityAndOffset,
            pucch-CSI-ResourceList              SEQUENCE (SIZE (1..maxNrofBWPs)) OF
PUCCH-CSI-Resource
    },
        semiPersistentOnPUCCH               SEQUENCE { reportSlotConfig                    CSI-ReportPeriodicityAndOffset, pucch-CSI-ResourceList              SEQUENCE (SIZE (1..maxNrofBWPs)) OF PUCCH-CSI-Resource
    },
        semiPersistentOnPUSCH               SEQUENCE {
            reportSlotConfig                    ENUMERATED {sl5, sl10, sl20, sl40, sl80, sl160,
sl320},
            reportSlotOffsetList                SEQUENCE (SIZE (1.. maxNrofUL-Allocations))
OF INTEGER(0..32),
            p0alpha              P0-PUSCH-AlphaSetId
    },
        aperiodic            SEQUENCE {
            reportSlotOffsetList                SEQUENCE (SIZE (1..maxNrofUL-Allocations)) OF
INTEGER(0..32)
        }
    },
    reportQuantity           CHOICE {
        none                 NULL,
        cri-RI-PMI-CQI                          NULL,
        cri-RI-i1            NULL,
        cri-RI-i1-CQI                SEQUENCE {
            pdsch-BundleSizeForCSI                              ENUMERATED {n2, n4}
OPTIONAL - Need S
        },
        cri-RI-CQI                              NULL,
        cri-RSRP                                NULL,
        ssb-Index-RSRP                          NULL,
        cri-RI-LI-PMI-CQI                       NULL
    },
    reportFreqConfiguration                     SEQUENCE{
        cqi-FormatIndicator                     ENUMERATED { widebandCQI, subbandCQI }
OPTIONAL, -- NeedR
        pmi-FormatIndicator                     ENUMERATED { widebandPMI, subbandPMI }
OPTIONAL, -- NeedR
        csi-ReportingBand                       CHOICE {
            subbands3                           BIT STRING(SIZE(3)),
...
```

Through the MAC CE triggering the TRS, the CQI/CSI report may be triggered together. Since the TRS is received about once or twice, the terminal may transmit once a wideband CQI for a channel state measured based on the TRS.

report from the terminal to check whether the terminal is ready for reception. In addition, by utilizing the CQI/CSI from the terminal, fast scheduling according to an accurate channel state in the base station may be performed.

Table 7 shows an example of an RRC information element including a list for the aperiodic triggering state of CSI.

TABLE 7

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS, CSI-IM and/or SSB (reference signals) and aperiodic reporting on L1 according to all entries in the associatedReportConfigInfoList for that trigger state.

CSI-AperiodicTriggerStateList information element

```
-- ASN1START
-- TAG-CSI-APERIODICTRIGGERSTATELIST-START
CSI-AperiodicTriggerStateList ::=         SEQUENCE (SIZE (1..maxNrOfCSI-
AperiodicTriggers)) OF CSI-AperiodicTriggerState
CSI-AperiodicTriggerState ::=             SEQUENCE {
    associatedReportConfigInfoList                                SEQUENCE
(SIZE(1..maxNrofReportConfigPerAperiodicTrigger))           OF            CSI-
AssociatedReportConfigInfo,
    ...,
    [[
    ap-CSI-MultiplexingMode-r17                        ENUMERATED {enabled}
OPTIONAL    Need R
    ]]
}
CSI-AssociatedReportConfigInfo ::=   SEQUENCE {
    reportConfigId            CSI-ReportConfigId,
    resourcesForChannel       CHOICE {
        nzp-CSI-RS            SEQUENCE {
            resourceSet                        INTEGER (1..maxNrofNZP-CSI-RS-
ResourceSetsPerConfig),
            qcl-info                           SEQUENCE (SIZE(1..maxNrofAP-CSI-RS-
ResourcesPerSet)) OF TCI-StateId
                                                                OPTIONAL -- Cond
Aperiodic
        },
        csi-SSB-ResourceSet                  INTEGER (1..maxNrofCSI-SSB-
ResourceSetsPerConfig)
    },
    csi-IM-ResourcesForInterference                     INTEGER(1..maxNrofCSI-IM-
ResourceSetsPerConfig)                OPTIONAL, -- Cond CSI-IM-ForInterference
    nzp-CSI-RS-ResourcesForInterference                 INTEGER(1..maxNrofNZP-CSI-RS-
ResourceSetsPerConfig)     OPTIONAL, -- Cond NZP-CSI-RS-ForInterference
    ...,
}
-- TAG-CSI-APERIODICTRIGGERSTATELIST-STOP
-- ASN1STOP
```

In the above-described examples, CQI/CSI repeated transmission may also be applied (e.g., similarly to the CSI/CQI repeated transmission scheme in URLLC) to increase reliability.

Embodiment 5-1

The present embodiment relates to a method of reusing the state list of the existing RRC message.

A new RRC signaling message related to the TRS ID may be defined. For example, the new message may include QCL information, transmission time related information (e.g., triggering offset, burst gap (offset), or the like to be described below), CQI/CSI reporting related information transmission scheme, CSI-RS related information, or the like. To this end, rather than newly defining a RRC signaling message, a method of assigning an index as an ID for the triggering of the TRS on the existing RRC message may be applied.

In some examples of the present disclosure, following TRS triggering, the base station may receive a CQI/CSI As shown in Table 7, for the RRC message used for the conventional aperiodic CQI/CSI report triggering purpose, there may be a maximum of 16 CSI-AssociatedReportConfigInfo. That is, there may be 16 CSI-ApriodicTriggerStates, and a state value may be used as an index of the TRS ID of the SCell. In this case, one of 16 CSI-RS resources configured through initial RRC signaling may be configured for TRS usage without additionally defining a new RRC message. For example, one of the CSI-AperiodicTriggerStateList may be used to configure the CSI-RS for the TRS, and the ID length of the TRS may be configured to 4 bits.

As described above, to configure/indicate that the CQI/CSI report is not required after the terminal receives the TRS, a specific value of the CSI-ReportConfigID parameter included in the corresponding message may be predetermined. That is, when the value of CSI-ReportConfigID is configured to a predetermined specific value, it may indicate to the terminal that CQI/CSI reporting is not performed for the corresponding TRS triggering. For example, when the ID value of the CSI reporting-related configuration is in the range of 0 to 48, a value of 48 may be defined as indicating that CQI/CSI reporting is not performed. Alternatively, the CSI-ReportConfigID parameter which is defined as an attribute of being included mandatorily in the message, may be changed to an optional parameter.

Alternatively, one specific state value among 16 states of CSI-AperiodicTriggerState may be defined as indicating that TRS is not triggered or TRS-based CSI reporting is not performed. Such specific state value may be defined as 0, null, or the like.

In this case, to configure/indicate that the CSI-AperiodicTriggerState is associated with the TRS in the RRC layer, a new RRC parameter indicating the association through the indicator may be defined.

For example, in the information element for the CSI measurement configuration (CSI-MeasConfig) in the RRC messages, a field indicating the identifier of the TRS (or Temporary RS) may be newly defined, and the corresponding field may indicate one of the TRS-related report configuration information.

TABLE 8

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included.

CSI-MeasConfig information element

```
-- ASN1START
-- TAG-CSI-MEASCONFIG-START
CSI-MeasConfig ::=                      SEQUENCE {
    nzp-CSI-RS-ResourceToAddModList     SEQUENCE (SIZE (1..maxNrofNZP-CSI-RS-
Resources)) OF NZP-CSI-RS-Resource      OPTIONAL, - Need N
    nzp-CSI-RS-ResourceToReleaseList    SEQUENCE (SIZE (1..maxNrofNZP-CSI-RS-
Resources)) OF NZP-CSI-RS-ResourceId    OPTIONAL, -- Need N
    nzp-CSI-RS-ResourceSetToAddModList        SEQUENCE (SIZE (1..maxNrofNZP-CSI-
RS-ResourceSets)) OF NZP-CSI-RS-ResourceSet
                                                                 OPTIONAL,    --
Need N
    nzp-CSI-RS-ResourceSetToReleaseList    SEQUENCE (SIZE (1..maxNrofNZP-CSI-RS-
ResourceSets)) OF NZP-CSI-RS-ResourceSetId
                                                                 OPTIONAL,    --
Need N
    csi-IM-ResourceToAddModList              SEQUENCE (SIZE (1..maxNrofCSI-IM-
Resources)) OF CSI-IM-Resource           OPTIONAL, -- Need N
    csi-IM-ResourceToReleaseList        SEQUENCE (SIZE (1..maxNrofCSI-IM-Resources))
OF CSI-IM-ResourceId             OPTIONAL, -- Need N
    csi-IM-ResourceSetToAddModList           SEQUENCE (SIZE (1..maxNrofCSI-IM-
Resource Sets)) OF CSI-IM-ResourceSet    OPTIONAL, -- Need N
    csi-IM-ResourceSetToReleaseList          SEQUENCE (SIZE (1..maxNrofCSI-IM-
Resource Sets)) OF CSI-IM-ResourceSetId  OPTIONAL, -- Need N
    csi-SSB-ResourceSetToAddModList          SEQUENCE (SIZE (1..maxNrofCSI-SSB-
ResourceSets)) OF CSI-SSB-ResourceSet    OPTIONAL, -- Need N
    csi-SSB-ResourceSetToReleaseList         SEQUENCE (SIZE (1..maxNrofCSI-SSB-
Resource Sets)) OF CSI-SSB-ResourceSetId    OPTIONAL, -- Need N
    csi-ResourceConfigToAddModList           SEQUENCE (SIZE (1..maxNrofCSI-
ResourceConfigurations)) OF CSI-ResourceConfig
                                                                 OPTIONAL,    --
Need N
    csi-ResourceConfigToReleaseList          SEQUENCE (SIZE (1..maxNrofCSI-
ResourceConfigurations)) OF CSI-ResourceConfigId
                                                                 OPTIONAL,    --
Need N
    csi-ReportConfigToAddModList             SEQUENCE (SIZE (1..maxNrofCSI-
ReportConfigurations)) OF CSI-ReportConfig   OPTIONAL, -- Need N
    csi-ReportConfigToReleaseList            SEQUENCE (SIZE (1..maxNrofCSI-
ReportConfigurations)) OF CSI-ReportConfigId
                                                                 OPTIONAL,    --
Need N
    reportTriggerSize       INTEGER (0..6)                       OPTIONAL,
-- Need M
    aperiodicTriggerStateList             SetupRelease { CSI-AperiodicTriggerStateList }
OPTIONAL, -- Need M
    semiPersistentOnPUSCH-TriggerStateList             SetupRelease    { CSI-
SemiPersistentOnPUSCH-TriggerStateList }    OPTIONAL, -- Need M
    ...,
    [[
    reportTriggerSizeDCI-0-2-r16                                 INTEGER (0..6)
OPTIONAL -- Need R
    ]]
    [[
    TempoaryRSID SEQUENCE (SIZE ((1..16)) OF CSI-AssociatedReportConfigInfo
```

Embodiment 5-2

The present embodiment relates to a method of defining a new RRC message by adding parameters related to CQI/CSI reporting.

A new RRC message may be defined by including the NSP-CSI-RS-ResourceSet that configures the resource set for the NZP-CSI-RS in the RRC signaling scheme for configuring the CSI-RS resource for the TRS/Temporary RS purpose.

A new RRC message may include a parameter set as shown in Table 10.

TABLE 9

```
...
Temporary RS for Scell Activation_List ::= SEQUENCE (SIZE (1..maxNrOfCSI-
AperiodicTriggers)) OF Temporary RS for Scell Activation
Temporary RS for Scell Activation :: =     SEQUENCE {
reportConfigId CSI-ReportConfigId
resourceSet NZP-CSI-RS-ResourceSetId
NumberofTemporaryBursts            { 1 or 2}
gapBetweenTRSforScellActivationBursts      {2...31}
...
}
```

In the example of Table 9, the NZP-CSI-RS-ResourceSet information element indicated by the NZP-CSI-RS-ResourceSetId may be configured as shown in Table 10.

TABLE 10

The IE NZP-CSI-RS-ResourceSet is a set of Non-Zero-Power (NZP) CSI-RS resources (their IDs) and set-specific parameters.

NZP-CSI-RS-ResourceSet information element

```
-- ASN1START
-- TAG-NZP-CSI-RS-RESOURCESET-START
NZP-CSI-RS-ResourceSet ::=       SEQUENCE {
  nzp-CSI-Resource SetId         NZP-CSI-RS-ResourceSetId,
  nzp-CSI-RS-Resources           SEQUENCE (SIZE (1..maxNrofNZP-CSI-RS-
ResourcesPerSet)) OF NZP-CSI-RS-ResourceId,
  repetition           ENUMERATED { on, off }             OPTIONAL,
-- Need S
  aperiodicTriggeringOffset   INTEGER(0..6)               OPTIONAL,
-- Need S                                                 OPTIONAL,
  trs-Info           ENUMERATED {true}
-- Need R
  ...,
  [[
  aperiodicTriggeringOffset-r16                           INTEGER(0..31)
OPTIONAL   --Need S
  ]]
}
-- TAG-NZP-CSI-RS-RESOURCESET-STOP
-- ASN1STOP
```

In the above example, when the value of CSI-ReportConfigID is configured to a predetermined specific value, it may indicate that CQI/CSI reporting for TRS is not performed.

Embodiment 5-3

The present embodiment relates to a parameter for information related to a gap between bursts.

TRS may be configured as at least one (e.g. one or two) burst. When configured with a plurality of bursts, a time offset between bursts (i.e., a gap between bursts) may be provided to the terminal through an RRC parameter. When the time offset between bursts, that is, the gap between the last slot of the first burst and the first slot of the second burst, is configured/indicated as $offset_2$, the first slot of the second burst may start at the $offset_2$-th slot after the end of the first burst.

For Scell fast activation, it may be required to repeatedly transmit the TRS several times instead of one (or one-shot) transmission. In this regard, depending on the channel state, whether to perform one burst transmission or up to two burst transmissions may vary. To support this, it is required to configure/indicate the number of bursts and an interval (or gap) between bursts to the terminal.

In this regard, for burst-related information in the RRC message, defining information (i.e., indicating one or two) on the number of burst and information (e.g., may indicate 2, 3, 4, . . . , 31 slots) on the burst gap (or interval) as separate parameters, and signaling all of them to the terminal has been discussed. For example, it was discussed that both parameters of the parameter gapBetweenTRSforSCellActivationBursts for the burst gap and the parameter NumberofTemoparyBursts for the number of bursts are included in the signaling message.

On the other hand, according to the present disclosure, considering that the number of bursts is at most 2 (i.e., the number of bursts is 1 or 2), and the burst gap is only required when there are 2 bursts, signaling overhead for the burst number information and the burst gap information is reduced. Specifically, when the value of the burst gap information is 0 or the burst gap information is absent (or is not included) in the RRC signaling information element, the number of bursts may be defined as 1. Alternatively, when the value of the burst gap information is not 0 (e.g., a value of 2 to 31) and burst gap information is present (or is included) in the RRC signaling information element, the number of bursts may be defined as 2. That is, the terminal may obtain information on the number of bursts (implicitly) from the burst gap information. In other words, the terminal may obtain two pieces of information (i.e., burst gap information and burst number information) from one parameter.

For example, it may be defined that, if the parameter for the burst gap is absent, the number of bursts is 1, and if the parameter for the burst gap is present, the number of bursts is 2. In this case, the range of the value of the parameter for the burst gap may be 2 to 31.

That is, when the number of bursts is 1, both parameters of the parameter for the number of bursts and the parameter for the burst gap are not included in the RRC signaling message, and when the number of bursts is 2, the parameter for the number of bursts without the parameter for the burst gap, that is, only one parameter may be included in the RRC signaling message.

For example, in the RRC information element, the parameter for the burst gap may be defined as a parameter corresponding to Need N (i.e., a one-shot configuration that is not maintained in the terminal, and when a message in which the corresponding field is absent is received, the terminal does not perform any action).

Embodiment 6

The present embodiment relates to the TRS timing indication method, the fast triggering method of CSI report, the method indicating the gap length through the MAC, operation method for the QCL relation of the TRS, or the like, related to the SCell activation indicated through the MAC CE.

For example, when indicating the activation of the (currently inactive) SCell through the MAC CE in the PCell (or any activated SCell), a method for more efficiently scheduling the first PDSCH of the corresponding SCell, a method of CSI reporting for the base station to check the SCell activation completion status of the terminal, a TRS reference timing for the terminal to prepare for reception from the base station, and various enhanced methods for the TRS transmission scheme will be described below.

Embodiment 6-1

The present embodiment relates to a method of indicating TRS transmission (reception) timing for fast SCell activation.

RRC configuration information related to TRS may be defined as, for example, a configuration information element (e.g., SCellActivationRS-Config) for the SCell activation reference signal shown in Table 11.

TABLE 11

The IE SCellActivationRS-Config is used to configure a Reference Signal for efficient activation of the SCell where the IE is included. Usage of a SCellActivationRS-Config is indicated by including its scellActivationRS-Id in the Enhanced SCell activation MAC CE.

SCellActivationRS-Config information element

```
-- ASN1START
-- TAG-SCELLACTIVATIONRS-CONFIG-START
SCellActivationRS-Config-r17 ::= SEQUENCE {
    scellActivationRS-Id-r17      SCellActivationRS-ConfigId-r17,
    resourceSet-r17               NZP-CSI-RS-ResourceSetID,
    gapBetweenBursts-r17 INTEGER (2..31)          OPTIONAL, -- Need R
    qcl-Info-r17                  SEQUENCE (SIZE(1..maxNrofAP-CSI-RS-ResourcesPerSet))
OF TCI-StateId,
Temporary RS_timeoffset           INTERGER(xxxxxx)
-
    ...
}
--TAG-SCELLACTIVATIONRS-CONFIG-STOP
-- ASN1STOP
```

In the example of Table 11, a parameter (e.g., referred to as Temporary RS_timeoffset) related to after how many slots (i.e., offset) the TRS is transmitted/received from the reference timing may be defined. For example, the reference slot for the triggering offset of the TRS may be defined as the last downlink (DL) slot in the to-be-activated SCell overlapping the slot n+k. The terminal may receive the triggered TRS in the earliest slot that does not precede the reference slot (i.e., after the reference slot) and satisfies a predetermined condition. That is, assuming that the value of the triggering offset is $offset_1$, the timing at which TRS transmission/reception starts (the first slot of the first TRS burst, if there are a plurality of TRS bursts) may be determined as the $offset_1$-th slot after the reference slot.

Example A: If there is no RRC parameter (e.g., Temporary RS_timeoffset in Table 11) value for the triggering offset, TRS transmission/reception may be performed assuming that the slot offset value is 0 from the SCell DL reference timing. In this case, since the slot offset may be individually configured for each TRS, the flexibility is high, but the RRC signaling overhead may be increased correspondingly.

Example B: When a new parameter for slot offset configuration (e.g., Temporary RS_timeoffset in Table 11) is not directly included in TRS-related RRC configuration information as in Example A, TRS may be configured based on the NZP-CSI-RS-ResourceSet of a specific ID as in the example of Table 10. That is, the TRS may be associated with a specific NZP-CSI-RS-ResourceSetID. Accordingly, an existing slot offset parameter (e.g., aperiodicTriggeringoffset or aperiodicTriggeringoffset-r16) in the NZP-CSI-RS-ResourceSet configuration information may be reused as a slot offset value for determining TRS transmission/reception timing. In this case, the RRC signaling overhead may be reduced because parameters preconfigured for other purposes are also applied to the TRS, but flexibility may be reduced since a plurality of TRSs having the same resource set ID are all configured with the same slot offset only.

Example C: The base station may selectively apply one of example A or example B. When the slot offset of example A (e.g., Temporary RS_timeoffset) is included in the message for configuring the TRS, the corresponding value is applied, and when not included, the slot offset for other usages of example B (e.g., aperiodicTriggeringoffset or aperiodicTriggeringoffset-r16) may be applied to TRS by reuse.

In the above-described examples, a slot (e.g., slot n+k) being a reference for applying a slot offset (or triggering offset) for TRS may be defined as follows. Unlike the slot that DCI schedules for triggering CSI-RS or CSI report in the existing aperiodic CSI-RS transmission/reception scheme, the reference slot being the basis for applying the offset to TRS transmission/reception may be newly defined.

For example, the transmission/reception time point of the first TRS (for example the first slot of the first TRS burst, if there are multiple TRS bursts) may be determined as a slot (i.e., slot n+k+offset$_1$) after the slot offset (e.g., offset$_1$) from the reference slot. Here, the reference slot may be determined as a slot (i.e., slot n+k) that is k slots after the last slot (which is referred to as slot n) on the corresponding SCell in which the MAC CE including the SCell activation related information (or the PDSCH carrying the same) is received For example, the reference slot for the TRS may be determined analogously with the reference slot n+k in Table 12 below.

TABLE 12

With reference to slots for PUCCH transmissions, when a UE receives in a PDSCH an activation command for a secondary cell ending in slot n, the UE applies the corresponding actions in no later than the minimum requirement and no earlier than slot n+k except for the following:
- the actions related to CSI reporting on a serving cell that is active in slot n+k
- the actions related to the sCellDeactivationTimer associated with the secondary cell that the UE applies in slot n+k
- the actions related to CSI reporting on a serving cell which is not active in slot n+k that the UE applies in the earliest slot after n+k in which the serving cell is active.
The value of k is $k_1+3*N_{slot}^{subframe,u}+1$ where $k_1$ is a number of slots for a PUCCH transmission with HARQ-ACK information for the PDSCH reception and is indicated by the PDSCH-to-HARQ feedback timing field in the DCI format scheduling the PDSCH reception and $N_{slot}^{subframe,u}$ is a number of slots per subframe for the SCS configuration u of the PUCCH transmission.

As described in Table 12, when reception of a PDSCH including information triggering at least one TRS burst ends in slot n, a reference slot may correspond to slot n+k. Here, it may be defined $k=k_1+3*N_{slot}^{subframe, u}+1$. Slot n+k$_1$ is a slot for PUCCH transmission including hybrid automatic repeat request-acknowledgement (HARQ-ACK) information for the PDSCH reception. In addition, $N_{slot}^{subframe,u}$ is the number of slots per subframe for the subcarrier spacing (SCS) configuration u of PUCCH transmission.

Figure 17:
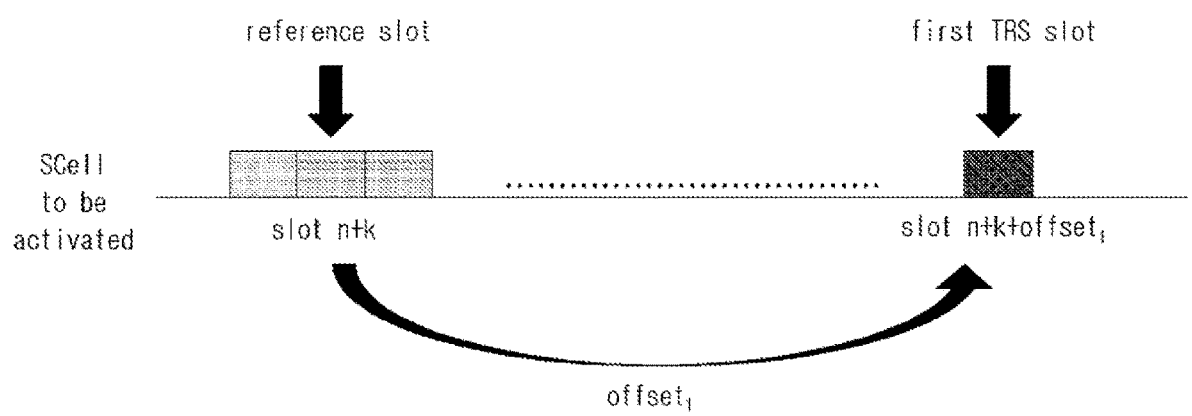
FIG. 17 is a diagram illustrating an example of a triggering offset of TRS according to the present disclosure.

FIG. 17 is a diagram illustrating an example of a triggering offset of a TRS according to the present disclosure.

It may be assumed that the SCell to be activated in FIG. 17 is SCell #1. The reference slot may correspond to the last DL slot of SCell #1, which overlaps with slot n+k determined as in the example of Table 12. The offset$_1$-th slot after this reference slot may be determined as the first TRS transmission/reception slot (e.g., the first slot of the first TRS burst).

As an additional example, when reusing an existing parameter for another purpose as a configuration parameter of the TRS triggering offset (or slot offset), the definition of the corresponding parameter may be modified as shown in Table 13. That is, since the existing parameter for other uses defines the offset between the slot including DCI and the slot in which the CSI-RS resource set is transmitted, for the TRS triggering offset according to the present disclosure, it may be modified to define the offset between the reference slot according to Table 12 (that is, the slot n+k) and the transmission/reception slot of the CSI-RS resource set (i.e., TRS).

TABLE 13 aperiodicTriggeringOffset, aperiodicTriggeringOffset-r16

Offset X between the slot containing the DCI that triggers a set of aperiodic NZP CSI-RS resources or the reference slot (i.e., slot n+k defined in Table 12 and the slot in which the CSI-RS resource set is transmitted. For aperiodicTriggeringOffset, the value 0 corresponds TABLE 13-continued aperiodicTriggeringOffset, aperiodicTriggeringOffset-r16 to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0.

Embodiment 6-2

This embodiment relates to a method of efficiently and fast triggering CSI reporting, to reduce the time portion (e.g., $T_{activation\_time}+T_{CSI\_Reporting}$ of FIG. 7) of the SCell activation operation and the CSI reporting operation.

After sending the SCell activation command, the base station may check the SCell activation preparation state of the terminal to perform the initial PDSCH scheduling. To this end, after the terminal receives the MAC CE for TRS triggering, CSI reporting may be performed based thereon.

For example, a resource for CSI reporting may be allocated/configured through an RRC message analogously with the method applied for aperiodic CSI-RS triggering. For example, in the example of Table 7, resources for CSI reporting based on TRS may be allocated/configured through parameters such as reportConfigId included in CSI-AssociatedReportConfigInfo.

As an additional example, a resourceSet parameter may be added in the SCellActivationRS-Config information element as shown in Table 14, and when the resourceSet parameter includes information about a specific reportconfigId (which indicates resources such as semi-persistentOnPUCCH related to the corresponding reportConfigId of CSI-ReportConfig as shown in Table 6), resources for CSI reporting based on TRS may be allocated/configured.

based on TRS may not be continuously reported. Hereinafter, specific examples related to TRS-based CSI reporting will be described. Here, in the CSI-ReportConfig shown in Table 6, reportQuantity (i.e., the type of report parameter included in the CSI report) may not be configured to none.

Example A: The terminal performs one CSI report after TRS reception.

Example B: After the semi-persistent CSI report configuration, the CSI report may be transmitted in a specific slot. Therefore, the number of times that CSI reporting is performed after CSI report configuration may be configured/defined in advance. For example, a specific number of times may be configured through a higher layer signaling, or a specific number of times may be implicitly determined without separate signaling. For example, when the number value is configured/determined to 4, CSI reporting may be stopped after performing CSI reporting only 4 times including the first transmission.

Example C: The number of CSI reports may be indicated through the MAC CE as in the example of FIG. 18(*a*).

FIG. 18 is a diagram illustrating examples of TRS-related MAC CEs according to the present disclosure.

In the examples of FIG. 18(*a*) to (*c*), after the first octet indicating the identifier of the activated SCell, as many octets as the number of activated SCells (e.g., n) may be added.

TABLE 14

The IE SCellActivationRS-Config is used to configure a Reference Signal for efficient activation of the SCell where the IE is included. Usage of a SCellActivationRS-Config is indicated by including its scellActivationRS-Id in the Enhanced SCell activation MAC CE.

SCellActivationRS-Config information element

-- ASN1START
-- TAG-SCELLACTIVATIONRS-CONFIG-START
SCellActivationRS-Config-r17 ::= SEQUENCE {
    scellActivationRS-Id-r17    SCellActivationRS-ConfigId-r17,
    resourceSet-r17          NZP-CSI-RS-ResourceSetID,
    gapBetweenBursts-r17   INTEGER (2..31)         OPTIONAL, -- Need R
       qcl-Info-r17          SEQUENCE (SIZE(1..maxNrofAP-CSI-RS-ResourcesPerSet))
OF TCI-StateId,
reportConfigId         CSI-ReportConfigId,
   ...
}
--TAG-SCELLACTIVATIONRS-CONFIG-STOP
-- ASN1STOP In use for CSI reporting, the semi-persistent configuration information included in the CSI-ReportConfig RRC configuration information through the CSI-ReportConfigID may include a PUCCH resource, a transmission periodicity, or the like. When information such as PUCCH resource and transmission periodicity is not included, CSI reporting may not be performed.

Here, unlike the existing semi-persistent CSI-RS that is continuously transmitted from the base station after being triggered, the TRS may be transmitted through one burst or two bursts after being triggered. Therefore, CSI measured In the example of FIG. 18(*a*), each additional octet may include a CSI report-related X bit and a TRS ID-related Y bit. The value of the X-bit field may indicate the number of CSI reports, and the value of the Y-bit field may indicate the TRD ID. For example, CSI measured based on the TRS indicated by the Yi field may be reported X1 times. When the value of the X-bit field is 0, CSI reporting is not performed, and when the value is 1 or more (e.g., 1, 2, or 3 when the size of the X-bit field is 2 bits), the CSI reporting may be performed as many times as the number of times.

Embodiment 6-3

The present embodiment relates to a method of indicating the length of the gap for TRS burst transmission through the MAC CE.

TRS may be transmitted/received through a maximum of two bursts. Here, a method of indicating information on whether a single burst or a dual burst, and information on an offset (or gap) between bursts in the case of a dual burst through the MAC CE will be described.

In the examples of FIGS. 18(b) and (c), the bit size of the TRS-related octet is exemplary, and combinations of fields of various sizes may be included in the scope of the present disclosure. For example, in the examples of FIGS. 18(b) and (c), it is assumed that the size of the TRS ID field=X, the size of the AC field=Y, the size of the R field=Z; Y>=0, Z>=0; it may be X+Y+Z=8 (example of FIG. 18(b)) or X+Y+Z=4 (example of FIG. 18(c)).

Example A: In the case of dual burst, AC+R information may indicate the length of the burst gap. For example, a list of gap lengths (candidates) may be configured as a higher layer (e.g., RRC) parameter, and a value of AC+R information of MAC CE may indicate one of the corresponding list.

Example B: In the case of a single burst, AC+R information may indicate a value of 0.

Example C: When the list of higher layer parameters as in example A is configured, when the value of AC+R information is 0, the value of the 0-th index of the list may be indicated (i.e., indicating the dual burst, burst gap of the value mapped to the 0-th index being applied). When such a list is not configured by the higher layer, when the value of AC+R information is 0, it may be interpreted as indicating that it is a single burst.

In the above examples, the AC+R information of the example of FIG. 18(b) may be substituted with the R information of the example of FIG. 18(c).

Embodiment 6-4

The present embodiment includes an example for the QCL relation of the TRS.

Figure 19:
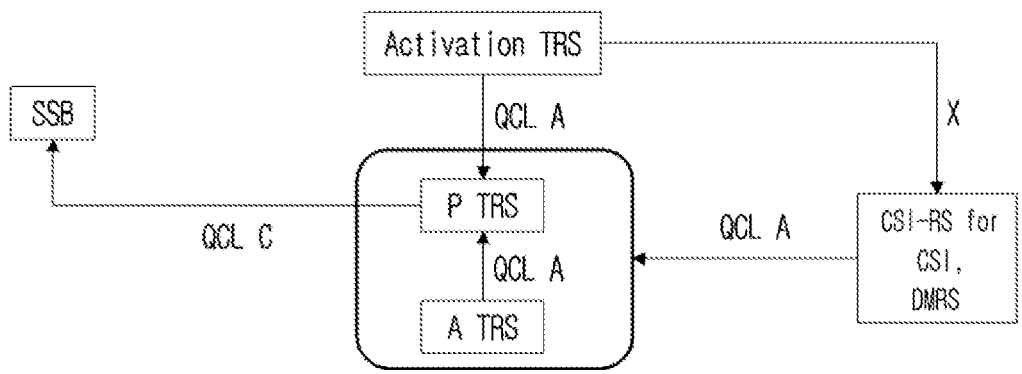
FIG. 19 is a diagram illustrating the QCL relationship of TRS according to the present disclosure.

FIG. 19 is a diagram illustrating the QCL relation of the TRS according to the present disclosure.

TRS according to the present disclosure is expressed as Activation TRS in the example of FIG. 19. This is to distinguish the TRS (or Temporary RS) related to SCell activation in the present disclosure from the existing tracking RS (tracking RS), and the TRS of the present disclosure may also be referred to as a tracking RS. P TRS means periodic TRS and A TRS means aperiodic TRS.

For example, for efficient SCell activation using Activation TRS (or Temporary RS), the P-TRS of the SCell to be activated in the case of a known SCell may be a QCL source for the Activation TRS (or Temporary RS). Here, the SSB of the SCell to be activated may be a QCL source for the P-TRS. SCell activation latency may be reduced even when P-TRS is configured as a QCL source for Activation TRS (or Temporary RS).

It may be defined whether Activation TRS (or Temporary RS) is used as a QCL source of another RS or not. The relationship indicated by X in FIG. 19 means that Activation TRS (or Temporary RS) may not be a CSI-RS for CSI and/or a QCL source for DMRS. For example, Activation TRS (or Temporary RS) is not used after PDSCH transmission and reception is performed on the PCell or SCell (that is, because it is utilized only at the early stage of SCell activation for fast SCell activation), so it is not appropriate to be used as a QCL source for the RS (e.g., CSI-RS for CSI and/or DMRS) to be transmitted periodically or frequently after SCell activation.

General Device to which the Present Disclosure May be Applied

Figure 20:
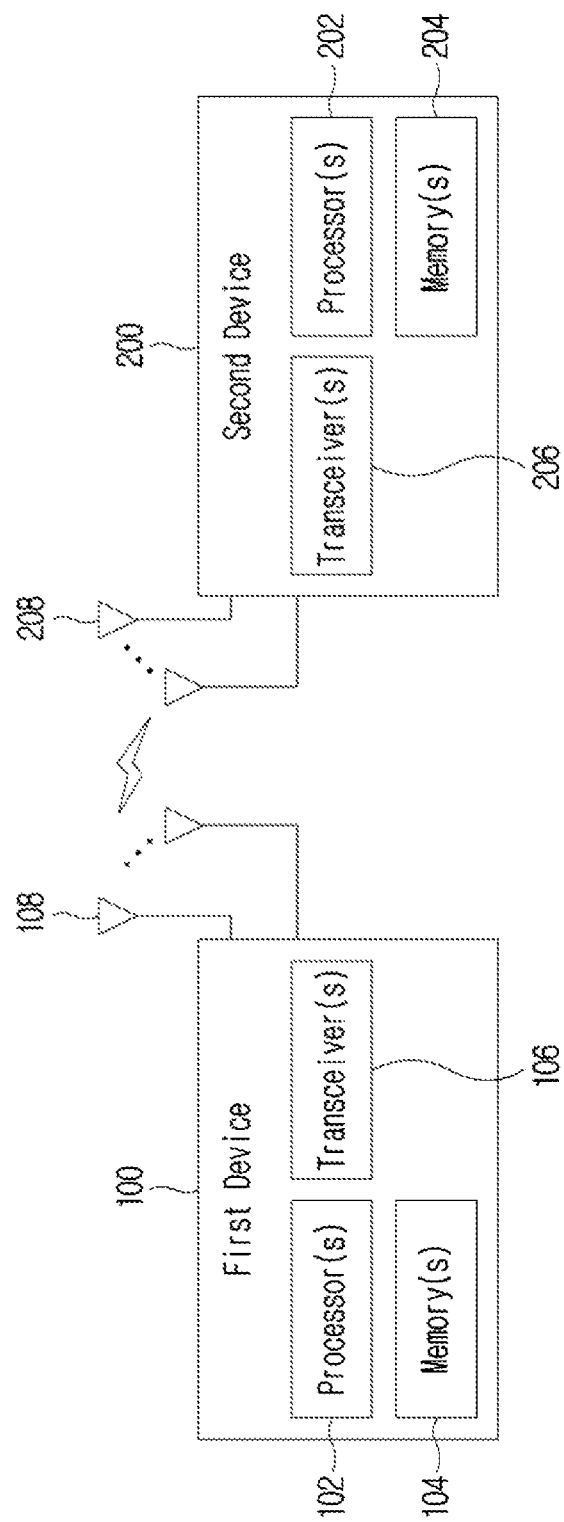
FIG. 20 is a diagram which illustrates a block diagram of a wireless communication device according to an embodiment of the present disclosure.

FIG. 20 illustrates a block diagram of a wireless communication device according to an embodiment of the present disclosure.

In reference to FIG. 20, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of receiving an aperiodic tracking reference signal (TRS) by a terminal in a wireless communication system, the method comprising:
receiving, from a network, through at least one radio resource control (RRC) information element including first offset information related to at least one burst of the aperiodic TRS;
receiving, from the network, through a medium access control (MAC) control element (CE), information triggering the at least one burst; and
receiving, from the network, the aperiodic TRS in the at least one burst,
wherein the first offset information is related to a first burst of the at least one burst, and
wherein, based on second offset information related to the at least one burst being present in the at least one RRC information element, the second offset information indicates an offset between the first burst and a second burst.

2. The method of claim 1, wherein:
based on the second offset information being present, a number of the at least one burst is two.

3. The method of claim 1, wherein:
the first offset information is received through a first RRC information element, and
the second offset information is received through a second RRC information element.

4. The method of claim 1, wherein:
the first offset information indicates a triggering offset value offset$_1$ based on a reference slot.

5. The method of claim 4, wherein:
a first slot of the first burst starts at the offset$_1$-th slot after the reference slot.

6. The method of claim 4, wherein:
based on a reception of a physical downlink shared channel (PDSCH) including information triggering the at least one burst ending in slot n, the reference slot is slot n+k, $$k=k_1+3*N_{slot}^{subframe,u}+1,$$

slot n+k$_1$ is a slot related to a transmission of a physical uplink control channel (PUCCH) including hybrid automatic repeat request-acknowledgment (HARQ-ACK) information for the PDSCH reception,
$N_{slot}^{subframe,u}$ is a number of slots per subframe for a subcarrier spacing (SCS) configuration u of the PUCCH transmission.

7. The method of claim 1, wherein:
based on the second offset information indicating an offset value offset$_2$ between the first burst and the second burst,
a first slot of the second burst starts at the offset$_2$-th slot after an end of the first burst.

8. The method of claim 7, wherein:
the offset$_2$ has a value of 2 or more.

9. The method of claim 1, wherein:
the MAC CE includes first information indicating identifier of N (N is an integer equal to or greater than 1) cell indicated to be activated, and second information including a field related to a TRS corresponding to each of the N cell.

10. The method of claim 9, wherein:
the N cell corresponds to a secondary cell (SCell) indicated to be activated among cells configured for the terminal.

11. The method of claim 1, wherein:
the aperiodic TRS corresponds to an aperiodic channel state information-reference signal (CSI-RS) for tracking for SCell related to fast SCell activation.

12. The method of claim 1, wherein, based on the second offset information related to the at least one burst information being absent in the at least one RRC information element, a number of the at least one burst is one.

13. A terminal for receiving an aperiodic tracking reference signal (TRS) in a wireless communication system, the terminal comprising:
at least one transceiver; and
at least one processor connected to the at least one transceiver,
wherein the at least one processor is configured to:
receive, from a network through the at least one transceiver, through at least one radio resource control (RRC) information element including first offset information related to the aperiodic TRS;
receive, from the network through the at least one transceiver, through a medium access control (MAC) control element (CE), information triggering the at least one burst and
receive, from the network through the at least one transceiver, the aperiodic TRS in the at least one burst,
wherein the first offset information is related to a first burst of the at least one burst, and
wherein, based on second offset information related to the at least one burst being present in the at least one RRC information element, the second offset information indicates an offset between the first burst and a second burst.

14. A base station for transmitting an aperiodic tracking reference signal (TRS) in a wireless communication system, the base station comprising:
at least one transceiver; and
at least one processor connected to the at least one transceiver,
wherein the at least one processor is configured to:
transmit, to a terminal through the at least one transceiver, through at least one radio resource control (RRC) information element including first offset information related to at least one burst of the aperiodic TRS;
transmit, to the terminal through the at least one transceiver, through a medium access control (MAC) control element (CE), information triggering the at least one burst; and
transmit, to the terminal through the at least one transceiver, the aperiodic TRS in the at least one burst,
wherein the first offset information is related to a first burst of the at least one burst, and
wherein, based on second offset information related to the at least one burst being present in the at least one RRC information element, the second offset information indicates an offset between the first burst and a second burst.

* * * * *

UNITED STATES PATENT AND TRADEMARK OFFICE
CERTIFICATE OF CORRECTION

PATENT NO.         : 11,743,012 B2
APPLICATION NO.    : 18/049907
DATED              : August 29, 2023
INVENTOR(S)        : Seungjin Ahn et al.

Page 1 of 1

It is certified that error appears in the above-identified patent and that said Letters Patent is hereby corrected as shown below:

In the Claims

In Column 50, Line 9, Claim 1:
Delete "receiving, from a network, through at least one radio" and insert --receiving, from a network, at least one radio--

In Column 51, Line 21, Claim 13:
Delete "ceiver, through at least one radio resource control" and insert --ceiver, at least one radio resource control--

In Column 52, Line 14, Claim 14:
Delete "through at least one radio resource control (RRC)" and insert --at least one radio resource control (RRC)--

Signed and Sealed this
Twenty-fourth Day of October, 2023

Katherine Kelly Vidal
*Director of the United States Patent and Trademark Office*